United States Patent
Zhang et al.

(10) Patent No.: US 11,584,097 B2
(45) Date of Patent: Feb. 21, 2023

(54) METHOD FOR MAKING OPAQUE COLORED SILICONE HYDROGEL CONTACT LENSES

(71) Applicant: Alcon Inc., Fribourg (CH)

(72) Inventors: Steve Yun Zhang, Sugar Hill, GA (US); Changhong Yin, Mansfield, TX (US); Richard Charles Breitkopf, Dunwoody, GA (US)

(73) Assignee: Alcon Inc., Fribourg (CH)

( * ) Notice: Subject to any disclaimer, the term of this patent is extended or adjusted under 35 U.S.C. 154(b) by 373 days.

(21) Appl. No.: 16/884,512

(22) Filed: May 27, 2020

(65) Prior Publication Data

US 2020/0376787 A1 Dec. 3, 2020

Related U.S. Application Data

(60) Provisional application No. 62/853,244, filed on May 28, 2019.

(51) Int. Cl.
| | |
|---|---|
| *B29D 11/00* | (2006.01) |
| *C07F 7/08* | (2006.01) |
| *C08L 83/04* | (2006.01) |
| *G02B 1/04* | (2006.01) |

(52) U.S. Cl.
CPC .. *B29D 11/00317* (2013.01); *B29D 11/00903* (2013.01); *C07F 7/0889* (2013.01); *C08L 83/04* (2013.01); *G02B 1/043* (2013.01)

(58) Field of Classification Search
CPC ................................................ B29D 11/00317
See application file for complete search history.

(56) References Cited

U.S. PATENT DOCUMENTS

| | | | |
|---|---|---|---|
| 3,536,386 | A | 10/1970 | Spivack |
| 4,136,250 | A | 1/1979 | Mueller |
| 4,153,641 | A | 5/1979 | Deichert |
| 4,182,822 | A | 1/1980 | Chang |
| 4,189,546 | A | 2/1980 | Deichert |
| 4,254,248 | A | 3/1981 | Friends |
| 4,259,467 | A | 3/1981 | Keogh |

(Continued)

OTHER PUBLICATIONS

Lai, et al., "Surface Wettability Enhancement of Silicone Hydrogel Lenses by Processing with Polar Plastic Molds", 1997, vol. 35, No. 3, Journal of Biomedical Materials Research, John Wiley & Sons, Inc., pp. 349-356.

*Primary Examiner* — Michael F Pepitone
(74) *Attorney, Agent, or Firm* — Jian Zhou

(57) ABSTRACT

The invention provides a thermal cast-molding method for producing colored silicone hydrogel contact lenses. The method of the invention comprises: (1) forming, on a molding surface of a mold, a transferable colored polymeric composite film which comprises or consists essentially of a first polymeric film, a second polymeric film and a cured colored image encapsulated therewithin; (2) dispensing a silicone hydrogel lens formulation into the lens-forming cavity of the mold; and (4) thermally curing the third polymerizable composition within the lens-forming cavity for at least about 40 minutes to form the colored silicone hydrogel contact lens, whereby the transferable, colored, and polymeric composite film detaches from the first or second molding surface and becomes integral with the body of the silicone hydrogel contact lens.

19 Claims, 2 Drawing Sheets

(56) References Cited

U.S. PATENT DOCUMENTS

| | | |
|---|---|---|
| 4,260,725 A | 4/1981 | Keogh et al. |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,536,554 A | 8/1985 | Lim |
| 4,543,398 A | 9/1985 | Bany et al. |
| 4,582,402 A | 4/1986 | Knapp |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,704,017 A | 11/1987 | Knapp |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 4,983,702 A | 1/1991 | Mueller |
| 5,010,141 A | 4/1991 | Mueller |
| 5,034,166 A | 7/1991 | Rawlings |
| 5,034,461 A | 7/1991 | Lai et al. |
| 5,039,761 A | 8/1991 | Ono et al. |
| 5,070,170 A | 12/1991 | Robertson |
| 5,070,215 A | 12/1991 | Bambury et al. |
| 5,079,319 A | 1/1992 | Mueller |
| 5,087,392 A | 2/1992 | Burke |
| 5,346,946 A | 9/1994 | Yokoyama et al. |
| 5,352,714 A | 10/1994 | Lai |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai |
| 5,637,265 A | 6/1997 | Misciagno |
| 5,656,210 A | 8/1997 | Hill et al. |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,166,236 A | 12/2000 | Bambury |
| 6,393,981 B1 | 5/2002 | Cameron |
| 6,762,264 B2 | 7/2004 | Kuenzler et al. |
| 6,867,245 B2 | 3/2005 | Iwata |
| 7,214,809 B2 | 5/2007 | Zanini et al. |
| 7,423,074 B2 | 9/2008 | Lai |
| 7,550,519 B2 | 6/2009 | Phelan et al. |
| 8,147,728 B2 | 4/2012 | Quinn et al. |
| 8,415,405 B2 | 4/2013 | Maggio |
| 8,475,529 B2 | 7/2013 | Clarke |
| 8,529,057 B2 | 9/2013 | Qiu |
| 8,614,261 B2 | 12/2013 | Iwata et al. |
| 8,658,748 B2 | 2/2014 | Liu et al. |
| 8,993,651 B2 | 3/2015 | Chang |
| 9,097,840 B2 | 8/2015 | Chang et al. |
| 9,103,965 B2 | 8/2015 | Chang |
| 9,217,813 B2 | 12/2015 | Liu |
| 9,315,669 B2 | 4/2016 | Holland et al. |
| 9,475,827 B2 | 10/2016 | Chang et al. |
| 9,505,184 B2 | 11/2016 | Kolluru et al. |
| 2001/0050753 A1 | 12/2001 | Tucker |
| 2003/0184710 A1 | 2/2003 | Tucker |
| 2003/0085934 A1 | 5/2003 | Tucker |
| 2003/0119943 A1 | 6/2003 | Tucker |
| 2005/0218536 A1* | 10/2005 | Quinn ............... B29D 11/00317 264/1.7 |
| 2008/0143003 A1* | 6/2008 | Phelan ............. B29D 11/00317 351/159.28 |
| 2012/0026457 A1 | 2/2012 | Qiu |
| 2012/0088843 A1 | 4/2012 | Chang |
| 2012/0088844 A1 | 4/2012 | Kuyu |
| 2013/0168884 A1* | 7/2013 | Morgan ........... B29D 11/00038 264/1.38 |
| 2017/0165930 A1* | 6/2017 | Morgan ........... B29D 11/00057 |
| 2017/0166673 A1 | 6/2017 | Huang et al. |
| 2017/0183520 A1 | 6/2017 | Breitkopf et al. |
| 2018/0079889 A1* | 3/2018 | Chiang ................ C07D 205/04 |
| 2018/0081197 A1 | 3/2018 | Qiu et al. |
| 2018/0100038 A1 | 4/2018 | Jing et al. |
| 2018/0100053 A1 | 4/2018 | Jing et al. |
| 2018/0104919 A1 | 4/2018 | Lu et al. |

* cited by examiner

METHOD FOR MAKING OPAQUE COLORED SILICONE HYDROGEL CONTACT LENSES

This application claims the benefit under 35 USC § 119 (e) of U.S. provisional application No. 62/853,244 filed 28 May 2019, herein incorporated by reference in its entirety.

The present invention generally relates to a method for making colored silicone hydrogel contact lenses. More specifically, the present invention relates to a method for making colored silicone hydrogel contact lenses with good image quality.

BACKGROUND OF THE INVENTION

Opaque colored contact lenses have been used to modify or enhance the color of a wearer's eyes. In general, the opaque colored lenses have a continuous opaque pattern that fully covers the iris or having an intermittent opaque pattern that does not fully cover the iris. Opaque colored contact lenses can effectively and substantially modify the wearer's eye color and more importantly can provide a natural appearance.

Opaque colored contact lenses can be produced by directly printing a colored image with an ink including pigment particles to the surface of a preformed contact lens. However, opaque colored contact lenses made according to this technique can have pigment particles protruding outwardly from the lens surface and may impart wearing discomfort when being worn by a user.

To reduce such wearing discomfort, opaque colored contact lenses can be advantageously produced according to a print-on-mold process. Such a process comprises first printing a colored image with a pigment-containing ink on a molding surface of a mold for cast-molding of a contact lens, dispensing a lens-forming composition in the mold with the colored image printed on one of the molding surface, and curing the lens-forming composition to obtain a cast-molded contact lens with the printed colored image which is transferred from the molding surface to the cast-molded contact lens during the curing process (see, U.S. Pat. No. 5,034,166). Although opaque colored contact lenses made according to this technique can have pigment particles embedded in the lens surface (i.e., not protruding outwardly from the lens surface) but still being exposed, the printed area (i.e., particle-exposing areas) on the surface of the opaque colored contact lenses would have a roughness much higher than that of the non-printed areas. The higher roughness in the printed area on a lens surface may still impart wearing discomfort.

To reduce the wearing comfort derived from the pigment-induced roughness in the printed area on a lens surface, a modified print-on-mold method is developed. This process comprises: applying a transferable clear coating on a molding surface of a mold for casting-molding of a colored contact lens; printing a colored image with a pigment-containing ink on the transferable clear coating on the molding surface; dispensing a lens-forming composition in the mold with the colored image printed on the transferable clear coating on one of the molding surface; and curing the lens-forming composition to obtain a cast-molded contact lens with the printed colored image thereon. The printing area is substantially covered by the clear coating and is, together with the transferable clear coating, transferred from the molding surface to the cast-molded contact lens during the curing process (see, e.g., U.S. Pat. No. 8,147,728). Opaque colored contact lenses made according to this technique can have pigment particles substantially covered by a clear coat in the printed area on the surface of the opaque colored contact lenses.

However, this improved mold-printing-transfer method may not used in producing opaque colored silicone hydrogel contact lenses from a polymerizable composition (i.e., a silicone hydrogel lens formulation) which contains various polymerizable components (e.g., siloxane-containing vinylic monomers, polysiloxane-containing vinylic crosslinkers, hydrophilic vinylic monomers, hydrophobic vinylic monomers, vinylic crosslinkers, etc.) and optionally an organic solvent according to thermal curing technique. Such a silicone hydrogel lens formulation can be invasive with respect to a printed colored image. After such a silicone hydrogel lens formulation is dispensed in the mold with the colored image printed and cured on the transferable clear coating and especially is in contact with the colored image for an extended time (e.g., typically greater than 40 minutes for thermal curing) before being thermally cured to form a colored silicone hydrogel contact lens, the pattern definition of the colored image could be lost due to the invasive nature of the silicone hydrogel lens formulation.

Therefore, there are still needs for a process for producing opaque colored silicone hydrogel contact lenses according to a thermal curing technique.

SUMMARY OF THE INVENTION

The invention provides a method for producing soft contact lenses, comprising the steps of: (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed; (2) forming, on the first or second molding surface, a transferable, colored, and polymeric composite film which comprises or consists essentially of a first polymeric film, a second polymeric film, and a cured colored image encapsulated therewithin, wherein the transferable, colored, polymeric composite film is formed by: (a) applying a first layer of a first polymerizable composition onto the first or second molding surface, wherein the first polymerizable composition is free of any pigment particle and comprises at least one first photoinitiator, (b) irradiating the first layer of the first polymerizable composition with a UV/visible light to at least partially cure the first layer to form a first polymeric film on the first or second molding surface, (c) printing a colored image with at least one ink on the first polymeric film on the first or second molding surface, wherein the ink comprises at least one pigment particles, an actinically-crosslinkable siloxane-containing binder polymer, a second photoinitiator, and at least one diluent, wherein the actinically-crosslinkable siloxane-containing binder polymer is soluble in said at least one diluent and comprises 1st repeating units each having an ethylenically unsaturated group, $2^{nd}$ repeating units of at least one first hydrophilic vinylic monomer and $3^{rd}$ repeating units of at least one first siloxane-containing polymerizable component selected from the group consisting of a first siloxane-containing vinylic monomer, a first polysiloxane-containing vinylic crosslinker, and combinations thereon, (d) irradiating the printed colored image with a UV/visible light to cure the colored images on the first polymeric film on the first or second molding surface; (e) applying a second layer of a second polymerizable composition to completely cover the cured colored image on the first polymeric film, wherein the second polymerizable composition is free of any pigment particle and comprises at least one second photoinitiator; and (f) irradiating the second layer of the second polymerizable composition with a UV/visible light to at least partially cure the second layer to form the second polymeric film which, in combination with the first polymeric film, encapsulates the cured colored image; (3) dispensing a third polymerizable composition into the lens-forming cavity of the mold, wherein the third polymerizable composition comprises (a) at least one second siloxane-containing polymerizable component selected from the group consisting of a second siloxane-containing vinylic monomer, a second polysiloxane containing vinylic crosslinker, and combinations thereof, (b) at least one second hydrophilic vinylic monomer, and (c) at least one thermal initiator, wherein the third polymerizable composition is in direct contact with and penetrates into the transferable, colored, and polymeric composite film on the first or second molding surface; and (4) thermally curing the third polymerizable composition within the lens-forming cavity for at least about 40 minutes to form the colored silicone hydrogel contact lens, whereby the transferable, colored, and polymeric composite film detaches from the first or second molding surface and becomes integral with the body of the silicone hydrogel contact lens.

BRIEF DESCRIPTIONS OF THE DRAWINGS

DESCRIPTION OF EMBODIMENTS OF THE INVENTIONS

Figure 1:
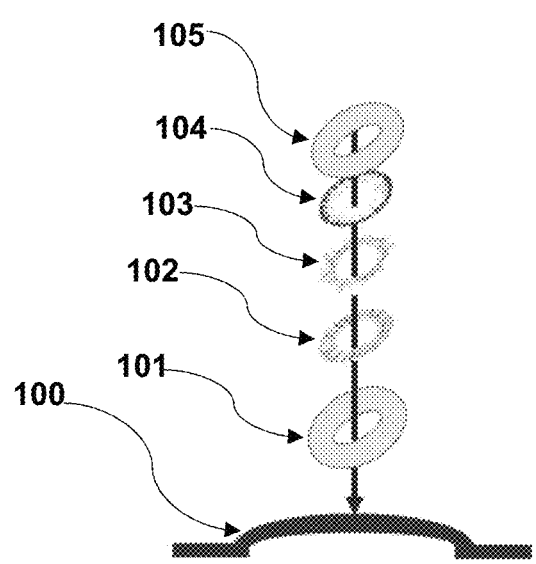
FIG. 1 illustrates schematically a process for forming a transferable colored polymeric composite film on a molding surface of a male mold half according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "non-silicone hydrogel contact lens" refers to a contact lens comprising a non-silicone hydrogel bulk (core) material (i.e., lens body). A "silicone hydrogel contact lens" refers to a contact lens comprising a silicone hydrogel bulk (core) material (i.e., lens body).

A "soft contact lens" refers to a contact lens which has an elastic modulus (i.e., Young's modulus) of less than 2.0 MPa (preferably less than 1.5 MPa, more preferably less than 1.0 MPa).

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

As used in this application, the term "non-silicone hydrogel" refers to a hydrogel that is theoretically free of silicon.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored silicone hydrogel contact lens" refers to a silicone hydrogel contact lens having a color image printed thereon and/or therein. A color image can be a cosmetic pattern, for example, iris-like patterns, Wild Eye™ patterns, made-to-order (MTO) patterns, and the like. A color image can be a single color image or a multi-color image.

The term "non-opaque" as used herein is intended to describe transparent or translucent color or a part of the lens that is uncolored or colored with transparent or translucent coloring.

"Colorant" means either a dye or a pigment or a mixture thereof that is used to print a color image on an article. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together. As defined herein, "primary colors" mean cyan, yellow, magenta, white, and black. A colorant may also be a mixture of at least one pigment and at least one dye. A person skilled in the art will know how to select colorants.

A "pigment" means a powdered substance that is suspended in a liquid in which it is insoluble. Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment be heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allows the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

An "actinically-crosslinkable binder polymer" refers to a polymer that comprises ethylenically-unsaturated groups and can be crosslinked actinically or thermally to trap or bind colorants onto or into a contact lens or a film such as that term is known in the art.

"Hydrophilic," as used herein, describes a material or portion thereof that will more readily associate with water than with lipids.

A "lens formulation" or "lens-forming composition" interchangeably refers to a polymerizable composition which can be cured (i.e., polymerized and/or crosslinked) thermally or actinically (i.e., by actinic radiation) to obtain a crosslinked polymer.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.05% by weight at room temperature (i.e., from about 20° C. to about 27° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C<group. Exemplary ethylenically unsaturated groups include without limitation (meth)acryloyl

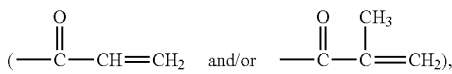

allyl, vinyl (—CH=CH$_2$) 1-methylethenyl

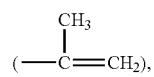

styrenyl, or the likes.

An "ene monomer" refers to a vinylic monomer comprising one sole vinyl group ($CH_2$=CH—) that is not covalently attached directly to an oxygen or nitrogen atom, a carbonyl group, or an aromatic ring.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

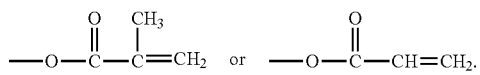

An "(meth)acrylamido monomer" refers to a vinylic monomer having one sole group of

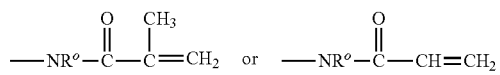

in which $R^O$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A "macromer" or "prepolymer" refers to a compound or polymer that contains ethylenically unsaturated groups and has an average molecular weight of greater than 700 Daltons.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the weight-average molecular weight unless otherwise specifically noted or unless testing conditions indicate otherwise.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

A "polysiloxane segment" refers to a polymer chain consisting of at least three consecutively- and directly-linked siloxane units (divalent radical) each independent of one another having a formula of

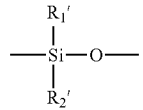

in which $R_{1'}$ and $R_{2'}$ are two substituents independently selected from the group consisting of $C_1$-$C_{10}$ alkyl, $C_1$-$C_4$-alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{\gamma 1}$—$OR^O$ (in which alk is $C_1$-$C_6$ alkyl diradical, $R^O$ is H or $C_1$-$C_4$ alkyl and $\gamma 1$ is an integer from 1 to 10), a $C_2$-$C_{40}$ organic radical having at least one functional group selected from the group consisting of hydroxyl group (—OH), carboxyl group (—COOH), —$NR_{3'}R_{4'}$, amino linkages of —$NR_{3'}$—, amide linkages of —$CONR_{3'}$—, amide of —$CONR_{3'}R_{4'}$, urethane linkages of —OCONH—, and $C_1$-$C_4$ alkoxy group, or a linear hydrophilic polymer chain, in which $R_{3'}$ and $R_{4'}$ independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

As used in this application, the term "phosphorylcholine" refers to a monovalent zwitterionic group of

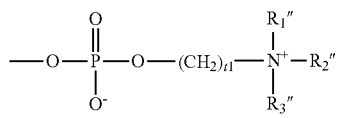

in which t1 is an integer of 1 to 5 and $R_1''$, $R_2''$ and $R_3''$ independently of one another are $C_1$-$C_8$ alkyl or $C_1$-$C_8$ hydroxyalkyl.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

A "print-on-mold process for producing colored contact lenses" refers to a process for molding a colored contact lens described in U.S. Pat. No. 5,034,166 to Rawlings et al. (herein incorporated by reference).

The invention is generally related to a method for producing colored silicone hydrogel contact lenses based on slow thermal curing technique. When the print-on-mold process and modified print-on-mold process known for making colored contact lenses are utilized in producing colored silicone hydrogel contact lenses based on thermal curing technique which requires an extended curing time (e.g., greater than 40 minutes), it is found that the pattern definition of the colored image on resultant colored silicone hydrogel contact lenses are significantly lost or disappeared. The invention is partly based on discovery that the pattern definition of the colored image on a resultant colored silicone hydrogel contact lens can be maintained by sandwiching or encapsulating a colored image between two clear layers of polymeric materials (i.e., a colored polymeric composite film). It is believed that a silicone hydrogel lens formulation can have a dispersing capability for pigment particles in the colored image due to the solvent and polymerizable components in the silicone hydrogel lens formulation. When a colored image (even though cured) on a clear coat on a molding surface is in contact with a silicone hydrogel lens formulation for an extended period of time (e.g., greater than 40 minutes), the polymer matrix formed from a binder polymer and optionally other polymerizable components in an ink may not be sufficient to prevent the pigment particles from being dispersed by the silicone hydrogel lens formulation, thereby losing the pattern definition of the printed colored image on the clear coat. By sandwiching or encapsulating a colored image between two clear layers of polymeric materials, the pattern definition of the printed colored image can be maintained. By selecting the two clear layers of the polymeric materials and having a silicone hydrogel lens formulation in contact with the composite colored layer for an extended time as required by thermal curing, the delamination of the composite colored layer from the resultant colored silicone hydrogel contact lenses would be minimized or eliminated.

In one aspect, the invention provides a method for producing soft contact lenses, comprising the steps of: (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed; (2) forming, on the first or second molding surface, a transferable, colored, and polymeric composite film which comprises or consists essentially of a first polymeric film, a second polymeric film, and a cured colored image encapsulated therewithin, wherein the transferable, colored, polymeric composite film is formed by: (a) applying a first layer of a first polymerizable composition onto the first or second molding surface, wherein the first polymerizable composition is free of any pigment particle and comprises at least one first photoinitiator, (b) irradiating the first layer of the first polymerizable composition with a UV/visible light to at least partially cure the first layer to form a first polymeric film on the first or second molding surface, (c) printing a colored image with at least one ink on the first polymeric film on the first or second molding surface, wherein the ink comprises at least one pigment particles, an actinically-crosslinkable siloxane-containing binder polymer, a second photoinitiator, and at least one diluent, wherein the actinically-crosslinkable siloxane-containing binder polymer is soluble in said at least one diluent and comprises $1^{st}$ repeating units each having an ethylenically unsaturated group, $2^{nd}$ repeating units of at least one first hydrophilic vinylic monomer and $3^{rd}$ repeating units of at least one first siloxane-containing polymerizable component selected from the group consisting of a first siloxane-containing vinylic monomer, a first polysiloxane-containing vinylic crosslinker, and combinations thereon, (d) irradiating the printed colored image with a UV/visible light to cure the colored images on the first polymeric film on the first or second molding surface; (e) applying a second layer of a second polymerizable composition to completely cover the cured colored image on the first polymeric film, wherein the second polymerizable composition is free of any pigment particle and comprises at least one second photoinitiator; and (f) irradiating the second layer of the second polymerizable composition with a UV/visible light to at least partially cure the second layer to form the second polymeric film which, in combination with the first polymeric film, encapsulates the cured colored image; (3) dispensing a third polymerizable composition into the lens-forming cavity of the mold, wherein the third polymerizable composition comprises (a) at least one second siloxane-containing polymerizable component selected from the group consisting of a second siloxane-containing vinylic monomer, a second polysiloxane containing vinylic crosslinker, and combinations thereof, (b) at least one second hydrophilic vinylic monomer, and (c) at least one thermal initiator, wherein the third polymerizable composition is in direct contact with and penetrates into the transferable, colored, and polymeric composite film on the first or second molding surface; and (4) thermally curing the third polymerizable composition within the lens-forming cavity for at least about 40 minutes to form the colored silicone hydrogel contact lens, whereby the transferable, colored, and polymeric composite film detaches from the first or second molding surface and becomes integral with the body of the silicone hydrogel contact lens.

Lens molds for making contact lenses are well known to a person skilled in the art and, for example, are employed in cast molding. In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface. The molding surface of a mold half is the cavity-forming surface of the mold and in direct contact with lens-forming material. Examples of preferred molds are those described in U.S. Pat. Appl. Pub. No. 2018/0104919.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Polar plastic molds can preferably be used to produce silicone hydrogel contact lenses having a much better wettability than non-polar plastic molds (e.g., polypropylene molds) (see, Lai and Friends, "Surface Wettability Enhancement of Silicone Hydrogel Lenses by Processing with Polar Plastic Molds", *J. Biomed. Mat. Res.* 35(3): 349-356 (1997); U.S. Pat. No. 5,352,714).

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002.

In accordance with the invention, the actinically-crosslinkable siloxane-containing binder polymer is obtained by ethylenically functionalizing a siloxane-containing polymer comprising $1^{st}$ repeating units each having a pendant functional group selected from the group consisting of a hydroxyl group (—OH), a primary amino group (—NH$_2$), a secondary amino group (—NHR$^O$ in which R$^O$ is H or C$_1$-C$_{10}$ alkyl), a carboxylic group (—COOH), an epoxy group, an aldehyde group (—CHO), an azlactone group, an aziridine group, an acid halide group (—COX, X=Cl, Br, or I), an isothiocyanate group, an isocyanate group, a halide group (—X, X=Cl, Br, or I), an acid anhydride group, and combinations thereof, as illustrated in U.S. Pat. No. 7,550,519.

In accordance with the present invention, the ethylenically functionalizing of a siloxane-containing polymer comprising $1^{st}$ repeating units each having a pendant functional group is carried out by reacting the siloxane-containing polymer with an ethylenically functionalizing agent which comprises an ethylenically unsaturated group and a group capable of reacting with the functional groups of the silicone-containing polymer to form covalent linkages according to a known coupling reaction (i.e., chemically attaching an ethylenically unsaturated group to one $1^{st}$ repeating unit of the siloxane-containing polymer).

A "coupling reaction" in this patent application is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof.

Non-limiting examples of coupling reactions under various reaction conditions between a pair of matching co-reactive functional groups selected from the group preferably consisting of amino group (—NHR$^O$ in which R$^O$ is H or C$_1$-C$_{10}$ alkyl), hydroxyl group, carboxyl group, acid halide group (—COX, X=Cl, Br, or I), acid anhydrate group, aldehyde group, azlactone group, isocyanate group, epoxy group, aziridine group, and thiol group, are given below for illustrative purposes. An amino group reacts with aldehyde group to form a Schiff base which may further be reduced; an amino group —NHR$^O$ reacts with an acid chloride or bromide group or with an acid anhydride group to form an amide linkage (—CO—NR$^o$—); an amino group —NHR$^O$ reacts with a N-hydroxysuccinimide ester group to form an amide linkage; an amino group —NHR$^O$ reacts with a carboxylic acid group in the presence of a coupling agent—carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) and N-hydroxysuccinimide to form an amide linkage; an amino group —NHR$^O$ reacts (ring-opening) with an azlactone group to form an alkylene-diamido linkage (—C(O)NH-alkylene-C(O)NR$^o$— with R$^O$ as defined above); an amino group —NHR' reacts with an isocyanate group to form a urea linkage (—NR$^o$—C(O)—NH— with R$^O$ as defined above); an amino group —NHR$^O$ reacts with an epoxy or aziridine group to form an amine bond (—C—NR$^o$— with R$^O$ as defined above); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form an amidoalkylenecarboxy linkage (—C(O)NH-alkylene-C(O)—O—); a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form an amidoalkylenethioester linkage; a thiol group reacts with a vinyl group based on thiol-ene reaction under thiol-ene reaction conditions to form a thioether linkage (—S—); a thiol group reacts with an acryloyl or methacryloyl group based on Michael Addition under appropriate reaction conditions to form a thioether linkage.

The reactions conditions for the above described coupling reactions are taught in textbooks and are well known to a person skilled in the art.

The siloxane-containing polymer is preferably a copolymerization product of a reactive composition, which comprises (a) at least one functional vinylic monomer having a functional group listed above (giving rise to $1^{st}$ repeating units), (b) at least one hydrophilic vinylic monomer (any one described below) (giving rise to 2nd repeating units), (c) at least one siloxane-containing polymerizable component (giving rise to $3^{rd}$ repeating units) selected from the group consisting of a siloxane-containing vinylic monomer (any one described below), a polysiloxane-containing vinylic crosslinker (any one described below), and combinations thereof, (d) a free radical initiator (i.e., a photoinitiator or a thermal initiator) (any one described below), (e) optionally but preferably a chain-transfer agent (preferably a thiol-containing compound) for controlling the molecular weight of the siloxane-containing polymer, and (f) a solvent (any one described below) which is preferably the solvent used in an ink, as illustrated in U.S. Pat. No. 7,550,519.

Any know suitable vinylic monomer containing at least one functional group can be used as ethylenically functionalizing vinylic monomer and as functional vinylic monomer in the present invention. Examples of ethylenically-functionalizing vinylic monomers and functional vinylic monomers are $C_2$ to $C_6$ hydroxylalkyl (meth)acrylate, $C_2$ to $C_6$ hydroxyalkyl (meth)acrylamide, amino-$C_2$-$C_6$ alkyl (meth)acrylamide, $C_1$-$C_6$ alkylamino-$C_2$-$C_6$ alkyl (meth)acrylamide, (meth)acrylic acid, $C_2$-$C_4$ alkylacrylic acid (e.g., ethylacrylic acid, propylacrylic acid, butylacrylic acid), N-[tris(hydroxymethyl)-methyl]acrylamide, N,N-2-acrylamidoglycolic acid, 3-(acryloylxy)propanoic acid, (meth)acryloyl halides ($CH_2$=CH—COX or $CH_2$=$CCH_3$—COX, X=Cl or Br), N-hydroxysuccinimide ester of (meth)acrylic acid, glycidyl (meth)acrylate, $C_1$ to $C_6$ isocyanatoalkyl (meth)acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-decyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), aziridinyl $C_1$-$C_{12}$ alkyl (meth)acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), acetal-containing vinylic monomers (e.g., acrolein, methacrolein, crotonaldehyde, acrolein dimethyl acetal, acrolein diethyl acetal, methacrolein dimethyl acetal, methacrolein diethyl acetal, methyl vinyl ketone, 3-methyl-3-buten-2-one, 3-penten-2-one, ethyl vinyl ketone, propyl vinyl ketone, isopropyl vinyl ketone, vinyl butyl ketone, tert-butyl vinyl ketone, iso-butyl vinyl ketone, methyl allyl ketone, and combinations thereof), and combinations thereof. Preferably, ethylenically functionalizing agents are glycidyl (meth)acrylate, 2-isocyanatoethyl (meth)acrylate (IEM), N-hydroxymethylacrylamide (NHMA), (meth)acryloylchloride, (meth)acrylic acid, 2-bromoethylmethacrylate, methacrylic anhydride, or combinations thereof.

It should be understood that a vinylic monomer can be used both as a hydrophilic vinylic monomer and as a functionalizing vinylic monomer in the reactive composition for preparing the siloxane-containing polymer with pendant functional groups. Preferably, the hydrophilic vinylic monomer is devoid of functional groups (e.g., N,N-dimethyl (meth)acrylamide, N-vinylpyrrolidone, N-vinyl-N-methyl acetamide, etc.).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

Suitable photoinitiators are benzoin methyl ether, diethoxyacetophenone, a benzoylphosphine oxide, 1-hydroxycyclohexyl phenyl ketone and Darocur and Irgacur types (Darocure 1173, Darocure 4265, Darocur 2959, Irgacure 2959, Irgacure 907, Irgacure 500, Irgacure 651, Irgacure 369), preferably Darocur 1173® and Darocur 2959®, Germanium-based Norrish Type I photoinitiators. Examples of benzoylphosphine oxide initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. In addition, combinations of photoinitiators can be used. Pigments in ink formulations can block or reduce the amount of UV/visible light that is required for initiating polymerization of the ink, thereby reducing cure speed of the ink. Photoinitiators that have a broad UV absorption spectrum can be used to help alleviate such problems. For example, benzoylphosphine oxide photoinitiators have strong UV absorption in longer UV and violet light regions and are effective in curing dark inks. Irgacure and Darcure initiators are available from CIBA specialty chemicals. Photosensitizers can also be added to an ink to facilitate curing of the ink.

Any thermal initiators can be used in the invention. Suitable thermal initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis [2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

In accordance with the invention, a diluent as known to a person skilled in the art can be an organic solvent, a mixture of two or more organic solvents, one or more vinylic monomers, a mixture of an organic solvent and one or more vinylic monomers, or mixtures thereof. Preferably, the diluent comprises at least one organic solvent. More preferably, the diluent further comprises the siloxane-containing vinylic monomer and the hydrophilic vinylic monomer which are polymerizable components in the silicone hydrogel lens formulation (i.e., the third polymerizable composition) in order to enhance the ink's compatibility with silicone hydrogels.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, an ink of the invention further comprises at least one polymeric dispersant selected from the group consisting of polyvinylpyrrolidone, alkylamino-functionalized polyethylene oxide and polypropylene oxides, polyoxyethylene alkylether polymers with a phosphate ester functionality, polyacrylic acid (PAA), polymethacrylic acid (PMAA), a homopolymer of vinylic monomer containing a dialkylamine group, a copolymer of vinylic monomer containing a dialkylamine group with another vinylic monomer, a homopolymer of a vinylic monomer containing a phosphate ester group, a copolymer of a vinylic monomer containing a phosphate ester group with another vinylic monomer, and combinations thereof (more preferrably a polyvinylpyrrolidone, even more preferably a polyvinylpyrrolidone having a weight average of molecular weight of from 4000 to 20000).

It is understood that a polymeric dispersant can improve the print ink life (which refers to the number of stacks past the dry cycle that can be printed for a single ink change, as described in U.S. Pat. Appl. Pub. No. 2017-0183520). Without limiting this invention to any particular mechanism or theory, it is believed during pad transfer printing, the cliche/cup block will heat up due to friction. The ink thickening is very rapid and therefore print intensities change rapidly over the course of a processing cycle. It is believed that a polymeric dispersant reduces metal-on-metal or pigment abrasion-based friction. Rapid Ink thickening due to heat and friction is responsible for short ink life because print intensities get too "dark" too soon. A polymeric dispersant when incorporated will control particle agglomeration and reduce friction at the cup blade-cliche interface, which reduces heat evolved and ink thickening, creates a more uniform print intensity over time.

An ink optionally includes a non-silicone vinylic crosslinker (any one described below), an adhesion promoter (any one described below), a humectant (any one known to a person skilled in the art), a surfactant (any one known to a person skilled in the art), an anti-kogating agent (any one known to a person skilled in the art), and other additives known in the art.

An "adhesion promoter" refers to a compound (or crosslinker) comprising two or more functional groups. A crosslinker molecule can be used to crosslink two or more monomers or polymer molecules. Many different crosslinking reactions could be used to cause chemical bonding between different binder polymer molecules to entrap the pigmented particles. Most crosslinkers are identified by bi- or multi-functional reactive groups. For example, diepoxide, dimelamine, diisocyanate, diaziridine, diazlactone, or dialdehyde resins could be used.

An ink for printing a colored lens of the invention can be prepared according to any known suitable methods. For example, a solution of binding polymer and diluents is prepared and this solution is mixed with paste containing the colorant to form an ink. It is currently preferred to form inks from binding polymer solutions having a viscosity of about 40,000 cps.

Inks for pad printing operations for this invention will preferably have one or more of the following characteristics: viscosity lower than about 50,000 cps, preferably lower than about 5000 cps and most preferably below 1500 cps, particle size less than about 5 μm (for non-pearlescent pigment), surface tension from about 20 mN/m to about 60 mN/m; prolonged stability (i.e., stable for about 4 hours, preferably at least 8 hours, more preferably 24 hours, even more preferably at least 7 days, most preferably at least three weeks); and an appropriate color level (visible by eye). The physical stability of an ink could differ from its chemical stability. For example, pigments might settle from the ink (physical phenomenon) yet the ink may not have undergone any significant chemical reaction. For such situations, the ink can be restored to a useable state by simply stirring or remixing. Other means of slowing or eliminating settling of pigment include but are not limited to use of additives, altering pH, in-line mixing, refrigeration, altering particle size of pigments, and coating pigment of pigment particles.

In accordance with the invention, a colored image is printed with an ink of the invention onto the first polymeric film on the first or second molding surface (preferably the first molding surface defining the anterior surface of a contact lens) according to pad transferring printing and/or inkjet printing technique, well known to a person skilled in the art.

Pad transfer printing is well known in the art (see, e.g., U.S. Pat. Nos. 3,536,386, 4,582,402, 4,704,017, 5,034,166). A typical example of this printing follows. An image is etched into metal to form a cliche. The cliche is placed in a printer. Once in the printer, the cliche is inked by either an open inkwell doctoring system or by a closed ink cup sliding across the image. Then, a silicone pad picks up the inked image from the cliche and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliche is made of a steel, it would be desirable to neutralize the pH of a water-based ink (e.g., adjusted pH to 6.8~7.8) by adding a buffer (such as, for example, phosphate salts). Images can be etched into a cliche according to any methods known to a person skilled in the art, for example, by chemical etching or laser ablation or the like. It is also desirable to clean cliches after use using standard cleaning techniques known to a person skilled in the art, such as, for example, immersion in a solvent, sonication, or mechanical abrasion.

Printing a colored image using an inkjet printing process is described in published U.S. Pat. Appl. Pub. Nos. 2001/0050753, 2001/0085934, 2003/0119943, and 2003/0184710.

After printing an ink of the invention on a molding surface of a mold, the printed ink can be cured actinically to an extent to minimize loss of pattern definition of the colored image resulted from subsequent filling of a silicone hydrogel lens formulation. It is believed that the siloxane-containing binder polymer in the ink can be crosslinked in the presence of the polymeric material of the first polymeric film on the first or second molding surface to form interpenetrating polymer networked (IPNs). Preferably, curing of the ink printed on the first polymeric film on the first or second molding surface does not consume all of ethylenically unsaturated groups of polymerizable components, especially the siloxane-containing binder polymer, in the ink. Unreacted ethylenically unsaturated or other crosslinkable groups in the ink can copolymerize with polymerizable components of the silicone hydrogel lens formulation (i.e., the third polymerizable composition) during the step of thermally curing the third polymerizable composition within the lens-forming cavity of the mold to form the colored silicone hydrogel contact lens.

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210.

In accordance with the invention, the first and second polymerizable composition independent of each other can comprises the polymerizable components of the ink and/or the third polymerizable composition, in order to ensure that the first and second polymeric films are compatible with the silicone hydrogel contact lens.

In a preferred embodiment, the first and second polymerizable composition independent of each other comprises the siloxane-containing binder polymer.

In another preferred embodiment, the first and second polymerizable composition independent of each other comprises the siloxane-containing polymerizable component and the hydrophilic vinylic monomer of the third polymerizable composition.

In another preferred embodiment, the first and second polymerizable composition independent of each other comprises a non-silicone vinylic crosslinker which comprises a (meth)acryloyl group and an ene group (i.e., a vinyl group is not covalently attached directly to an oxygen or nitrogen atom, a carbonyl group, or an aromatic ring). A (meth)acryloyl group has a relatively high radical reactivity whereas an ene group has a relatively low radical reactivity in a polymerization reaction. It is believed that the (meth)acryloyl group of such a non-silicone vinylic crosslinker can participate in photoinduced polymerization for forming the first and the second polymeric film, whereas the ene group does not participate in the photoinduced polymerization but can participate in thermal polymerization together with the polymerizable components of the third polymerizable composition for forming the colored silicone hydrogel contact lens.

Examples of preferred non-silicone vinylic crosslinkers each having a (meth)acryloyl group and an ene group include without limitation allyl (meth)acrylate, N-allyl (meth)acrylate, a coupling reaction product of an acrylic monomer having a first functional group selected from the group consisting of a primary group, a secondary amino group, an aziridine group, an azlactone group, a carboxyl group (i.e., —COOH), an epoxy group, an isocyanate group, and a hydroxyl group, with an ene monomer having a second functional group selected from the group consisting of a primary group, a secondary amino group, a carboxyl group (i.e., COOH), an epoxy group, an isocyanate group, and a hydroxyl group, wherein the first and second functional groups are different from each other but can react with each other in a coupling reaction to form a covalent linkage.

Examples of commercially available ene monomers having a functional group selected from the group consisting of a primary group, a secondary amino group, a carboxyl group (i.e., COOH), an epoxy group, an isocyanate group, and a hydroxyl group include without limitation allylamine, 3-butenylamine, 4-pentenylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, 3-butenoic acid, 4-pentenoic acid, 5-hexenoic acid, 6-heptenoic acid, allyloxy glycidyl ether, 1,2-ppoxy-5-hexene, 3,4-epoxy-1-butene, 2-methyl-2-vinyloxirane, allyl isocyanate, 4-isocyanato-1-butene, allyl alcohol, allyloxyethanol, allyloxyethoxyethanol, allyloxyethoxyethoxyethanol, allyloxyethoxyethoxyethoxyethanol, allyloxypolyethylene glycol, 4-hydroxy-1-butene, 5-hydroxy-1-pentene, 4-hydroxy-1-pentene, 3-hydroxy-1-pentene, and combinations thereof.

Examples of commercially available acrylic monomers having a functional group selected from the group consisting of a primary group, a secondary amino group, an aziridine group, an azlactone group, a carboxyl group (i.e., —COOH), an epoxy group, an isocyanate group, and a hydroxyl group include without limitation $C_2$ to $C_6$ hydroxylalkyl (meth)acrylate, $C_2$ to $C_6$ hydroxyalkyl (meth)acrylamide, amino-$C_2$-$C_6$ alkyl (meth)acrylamide, $C_1$-$C_6$ alkylamino-$C_2$-$C_6$ alkyl (meth)acrylamide, (meth)acrylic acid, $C_2$-$C_4$ alkylacrylic acid (e.g., ethylacrylic acid, propylacrylic acid, butylacrylic acid), N-[tris(hydroxymethyl)-methyl]acrylamide, N,N-2-acrylamidoglycolic acid, 3-(acryloylxy)propanoic acid, N-hydroxysuccinimide ester of (meth)acrylic acid, glycidyl (meth)acrylate, $C_1$ to $C_6$ isocyanatoalkyl (meth)acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), aziridinyl $C_1$-$C_{12}$ alkyl (meth)acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), and combinations thereof.

A first layer of a first polymerizable composition can be applied to a molding surface of mold by any suitable techniques, such as, for example, spraying, printing, swabbing, or dipping. For example, the first layer with substantially uniform thickness (e.g., up to 5 microns) can be prepared by spraying a molding surface with the first polymerizable composition (as described above). Similarly, a second layer of a second polymerizable composition can be applied to the first polymeric film having a colored image thereon on a molding surface of the mold.

The first and second layers of the first and second polymerizable compositions can be cured actinically by irradiating them with a UV/visible radiation, as well known to a person skilled in the art. Preferably, curing of the first and second layers is not complete, namely, does not consume all of ethylenically unsaturated groups of the polymerizable components in the first and second polymerizable composition. Unreacted ethylenically unsaturated or other crosslinkable groups in the ink can copolymerize with the polymerizable components of the silicone hydrogel lens formulation (i.e., the third polymerizable composition), which has penetrated into the first and second polymeric film, during the step of thermally curing the third polymerizable composition within the lens-forming cavity of the mold to form the colored silicone hydrogel contact lens.

It is believed that even if the first and second layers of the polymerizable compositions are completely cured, the polymerizable components of the third polymerizable composition can be crosslinked in the presence of the polymeric materials of the colored polymeric composite film (i.e., the first and second polymeric films) on the first or second molding surface to form interpenetrating polymer networked (IPNs). Adhesion of the colored polymeric composite film to the lens by IPN formation does not require the presence of reactive functional groups in the lens polymer. A colored polymeric composite film can be formed first according to the invention on a molding surface of a mold for making a silicone hydrogel contact lens. Then, a silicone hydrogel lens formulation (i.e., the third polymerizable composition) is dispensed in the mold. The silicone hydrogel lens formulation is allowed to penetrate into the colored polymeric composite film and then be cured to form a colored silicone hydrogel contact lens onto which the colored polymeric composite film is transferred from the mold.

In accordance with the invention, a siloxane-containing vinylic monomer, which can be used in preparing siloxane-containing binder polymer, the first to third polymerizable compositions and the ink, can be any vinylic monomer of formula (M1) or (M2), which will be described later in this application and can be obtained from commercial suppliers (e.g., Shin-Etsu, Gelest, etc.) or prepared according to procedures described in patents, e.g., U.S. Pat. Nos. 5,070, 215, 6,166,236, 6,867,245, 7,214,809, 8,415,405, 8,475,529, 8,614,261, 8,658,748, 9,097,840, 9,103,965, 9,217,813, and 9,475,827 or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred siloxane-containing vinylic monomers of formula (M1) include without limitation those described later in this application and those disclosed in U.S. Pat. Nos. 9,097,840 and 9,103,965, and mixtures thereof.

The above preferred polysiloxanes vinylic monomers of formula (M1) can be obtained from commercial suppliers (e.g., Shin-Etsu, Gelest, etc.) or prepared according to procedures described in patents, e.g., U.S. Pat. Nos. 5,070, 215, 6,166,236, 6,867,245, 7,214,809, 8,415,405, 8,475,529, 8,614,261, 8,658,748, 9,097,840, 9,103,965, 9,217,813, and 9,475,827 Examples of preferred siloxane-containing vinylic monomers of formula (M2) include without limitation those described later in this application and those disclosed in U.S. Pat. Nos. 9,097,840, 9,103,965 and 9,475, 827, and mixtures thereof.

Any suitable polysiloxane vinylic crosslinkers can be used in preparing siloxane-containing binder polymer, the first to third polymerizable compositions and the ink. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153, 641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070, 170, 5,079,319, 5,039,761, 5,346,946, 5,358,995, 5,387,632, 5,416,132, 5,451,617, 5,486,579, 5,962,548, 5,981,675, 6,039,913, and 6,7622,64; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups as disclosed in U.S. Pat. App. Pub. No. 2017-0166673 A1, more preferably a polysiloxane vinylic crosslinker of formula (I) which will be described later in this application and can be prepared according to procedures described in U.S. Pat. Appl. Pub. No. 2017-0166673 A1.

In a particularly preferred embodiment, a preferred polysiloxane vinylic crosslinker is represented by formula (A)

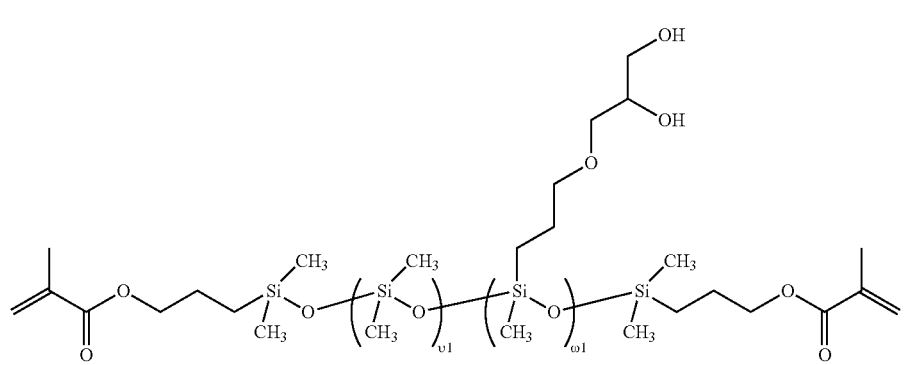

(A)

in which v1 and ω1 are as defined above.

Other classes of preferred polysiloxane vinylic crosslinkers are vinylic crosslinkers of any one of formula (1) to (7) which will be described later in this application.

Polysiloxane vinylic crosslinkers of formula (1) can be obtained from commercial suppliers, or prepared by reacting glycidyl (meth)acrylate (meth)acryloyl chloride with a di-amino-terminated polydimethylsiloxane or a di-hydroxyl-terminated polydimethylsiloxane, reacting isocyantoethyl (meth)acrylate with di-hydroxyl-terminated polydimethylsiloxanes, reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide). Or reacting a hydroxyl-containing acrylic monomer with a di-hydroxy-terminated polydisiloxane.

Preferred examples of polysiloxane vinylic crosslinkers of formula (1) include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, combinations thereof.

Chain-extended polysiloxane vinylic crosslinkers of formula (2) can be prepared according to the procedures described in U.S. Pat. Nos. 5,034,461, 5,416,132, 5,449,729, 5,760,100, 7,423,074, and 8,529,057. Chain-extended polysiloxane vinylic crosslinkers of formula (3), (4) or (5) can be prepared according to the procedures described in detail in U.S. Pat. App. Pub. No. 2018-0100053 A1. Chain-extended polysiloxane vinylic crosslinkers of formula (6) can be prepared according to the procedures described in detail in U.S. Pat. App. Pub. No. 2018-0100038 A1. Chain-extended polysiloxane vinylic crosslinkers of formula (7) can be prepared according to the procedures described in U.S. Pat. No. 8,993,651.

Another class of preferred chain-extended polysiloxane vinylic crosslinkers are those which each comprise at least two polysiloxane segments and dangling hydrophilic polymer chains each covalently attached to a divalent radical separating each pair of adjacent polysiloxane segments and having at least two pendant hydrophilic groups and/or chains as disclosed in U.S. Pat. Appl. Pub. No. 2012-0088843 A1; those which each comprise at least two polysiloxane segments and dangling hydrophilic polymer chains each covalently attached to a divalent radical separating each pair of adjacent polysiloxane segments as disclosed in U.S. Pat. Appl. Pub. No. 2012-0088844 A1.

In accordance with the invention, any suitable hydrophilic vinylic monomers can be used in preparing siloxane-containing binder polymer, the first to third polymerizable compositions and the ink of the invention. Examples of preferred hydrophilic vinylic monomers are alkyl (meth) acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described above), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth) acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth) acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth) acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing (=$CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth) acrylate having a number average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly (ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

In a preferred embodiment, the third polymerizable composition comprises at least one hydrophilic N-vinyl amide monomer (preferably selected from the group consisting of N-vinylpyrrolidone, N-vinyl-N-methyl acetamide, and combinations thereof).

In another preferred embodiment, the third polymerizable composition comprises at least one hydrophilic N-vinyl amide monomer (preferably selected from the group consisting of N-vinylpyrrolidone, N-vinyl-N-methyl acetamide, and combinations thereof) and at least one hydrophilic acrylic monomer (preferably selected from the group consisting of N,N-dimethyl (meth)acrylamide, (meth)acrylamide, N-hydroxyethyl (meth)acrylamide, N-hydroxypropyl (meth)acrylamide, hydroxyethyl methacrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1200, poly (ethylene glycol)ethyl (meth)acrylamide having a number average molecular weight of up to 1200, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth) acrylate, polyethylene glycol (meth)acrylate having a number average molecular weight of up to 1200, polyethylene glycol $C_1$-$C_4$-alkyl ether (meth)acrylate having a number average molecular weight of up to 1200, N-[tris(hydroxymethyl)methyl]-acrylamide, (meth)acrylic acid, ethylacrylic acid, 2-(meth)acrylamidoglycolic acid, a phosphorylcholine-containing vinylic monomer, and combinations thereof, more preferably from the group consisting of N,N-dimethyl (meth)acrylamide, hydroxyethyl (meth)acrylate, N-hydroxyethyl (meth)acrylamide, glycerol methacrylate (GMA), di(ethylene glycol) (meth)acrylate, tri(ethylene glycol) (meth)acrylate, tetra(ethylene glycol) (meth)acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof.

In accordance with the invention, a first, second, and third polymerizable compositions independent of one another can further comprise at least one hydrophobic acrylic monomer which is capable forming a homopolymer with a $T_g$ of at least about 60° C. (preferably at least about 70° C., more preferably at least about 80° C., even more preferably at least about 90° C.) and dissolving the siloxane-containing polymerizable components and the hydrophilic vinylic monomer of the silicone hydrogel lens formulation (the third polymerizable composition) to form a solution with a concentration of at least about 5% by weight. It is believed that such a hydrophobic acrylic monomer can increase a Tg of the dominant phase of a resultant silicone hydrogel material above the room temperature and may make the unprocessed silicone hydrogel lens precursor more rigid for demolding and delensing.

Examples of such hydrophobic acrylic monomers includes methyl methacrylate ($T_g$=105° C. of homopolymer), ethyl methacrylate ($T_g$=65° C. of homopolymer), isopropyl methacrylate ($T_g$=81° C. of homopolymer), sec-butyl methacrylate ($T_g$=60° C. of homopolymer), tert-butyl methacrylate ($T_g$=107° C. of homopolymer), cyclohexyl methacrylate ($T_g$=83° C. of homopolymer), isobornyl acrylate ($T_g$=94° C. of homopolymer), isobornyl methacrylate ($T_g$=110° C. of homopolymer), phenyl methacrylate ($T_g$=110° C. of homopolymer), 4-tert-butylstyrene ($T_g$=132° C. of homopolymer), 2-methylstyrene ($T_g$=120° C. of homopolymer), styrene ($T_g$=100° C. of homopolymer), 4-ethoxystyrene ($T_g$=86° C. of homopolymer), 2,4-dimethylstyrene ($T_g$=112° C. of homopolymer), 2,5-dimethylstyrene ($T_g$=143° C. of homopolymer), 3,5-dimethylstyrene ($T_g$=104° C. of homopolymer), and combinations thereof. More preferably, methyl methacrylate, tert-butyl methacrylate, cyclohexyl methacrylate, isobornyl acrylate, isobornyl methacrylate, or a combination thereof is used in the invention. Even more preferably, methyl methacrylate, tert-butyl methacrylate, cyclohexyl methacrylate, or a combination thereof is used in the invention.

In accordance with the invention, a first, second, and third polymerizable compositions independent of one another can further comprise about 2.0% or less (preferably about 1.5% or less, more preferably from about 0.1% to about 1.2%) by weight of one or more non-silicone vinylic crosslinkers relative to the total weight of the polymerizable composition.

Examples of preferred non-silicone vinylic cross-linking agents include without limitation ethyleneglycol di-(meth) acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth) acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth) acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis (meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamide-propane-2-yl dihydrogen phosphate (i.e., N,N'-2-phophonyloxypropylene bis(meth)acrylamide), piperazine diacrylamide (or 1,4-bis(meth)acryloyl piperazine), tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, or a combination thereof.

In a preferred embodiment, the third polymerizable composition (the silicone hydrogel lens formulation) comprises: (a) from about 15% to about 55% (preferably from about 20% to about 50%, even more preferably from about 25% to about 45%) by weight of said at least one siloxane-containing polymerizable component; (b) from about 35% to about 65% (preferably from about 40% to about 65%, more preferably from about 45% to about 65%) by weight of at least one hydrophilic vinylic monomer; (c) from about 2.0% or less (preferably about 1.5% or less, more preferably from about 0.1% to about 1.2%) by weight of said at least one non-silicone vinylic crosslinkers; (d) from about 5% to about 15% (preferably from about 6% to about 14%, more preferably from about 7% to about 13%, even more preferably from about 8% to about 12%) by weight of at least one hydrophobic acrylic monomer; (e) from 0 to about 16% (preferably from 0 to about 14%, more preferably from 0 to about 12%) by weight of at least one organic solvent; and (f) from about 0.1% to about 2.0% (preferably from about 0.2% to about 1.75%, more preferably from about 0.3% to about 1.5%, even more preferably from about 0.4% to about 1.25%) by weight of said at least one thermal free radical initiator, relative to the total amount of all polymerizable components in the polymerizable composition, provided that the sum of the amounts of components (a) to (f) and other not-listed polymerizable components is 100%.

A third polymerizable composition of the invention can also comprise other necessary components known to a person skilled in the art, such as, for example, a visibility tinting agent (e.g., one or more polymerizable dyes, pigments, or mixtures thereof), antimicrobial agents (e.g., preferably silver nanoparticles), UV-absorbing vinylic monomer, UV/HEVL-absorbing vinylic monomers, a bioactive agent, leachable lubricants, leachable tear-stabilizing agents, and mixtures thereof, as known to a person skilled in the art.

The term "UV/HEVL-absorbing vinylic monomer" refers to a vinylic monomer that can absorbs UV light and high-energy-violet-light (i.e., light having wavelength between 380 nm and 440 nm. Examples of UV-absorbing vinylic monomers and UV/HEVL-absorbing vinylic monomers are known to a person skilled in the art and are disclosed in the patents and patent application publications, e.g., U.S. Pat. No. 9,315,669, US 2018-0081197 A1, etc.

A first, second or third polymerizable composition of the invention can be prepared by thoroughly blending all of the desirable components.

Numerous SiHy lens formulations have been described in numerous patents and patent applications published by the filing date of this application. All of them can be used in obtaining a colored SiHy lens. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, enfilcon A, and efrofilcon A can also be used in making colored SiHy contact lenses.

In accordance with the invention, the third polymerizable composition can be introduced (dispensed) into the lens-forming cavity of a mold according to any known methods.

After the third polymerizable composition is dispensed into the lens-forming cavity the mold, it is polymerized to produce a colored silicone hydrogel contact lens. Polymerization is initiated thermally to crosslink the polymerizable components in the third polymerizable composition and in the colored polymeric composite film.

The thermal polymerization is carried out conveniently in an oven at elevated temperature, for example at a temperature of from 40° C. to 100° C. The reaction time may vary within wide limits, but is conveniently, for example, from 1 to 24 hours or preferably from 1 to 12 hours. It is advantageous to previously degas the components and solvents used in the polymerization reaction and to carry out said copolymerization reaction under an inert atmosphere, for example under a nitrogen or argon atmosphere.

Opening of the mold so that the molded article can be removed from the mold may take place in a manner known per se.

The molded colored silicone hydrogel contact lens can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

After extraction, the colored silicone hydrogel contact lens can further subject to further processes, such as, for example, surface treatment (especially the surface treatments described in U.S. Pat. Nos. 8,529,057 and 9,505,184), hydration, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing colored silicone hydrogel contact lenses, comprising the steps of:
   (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed;
   (2) forming, on the first or second molding surface, a transferable, colored, and polymeric composite film which comprises or consists essentially of a first polymeric film, a second polymeric film, and a cured colored image encapsulated therewithin, wherein the transferable, colored and polymeric composite film is formed by
      (a) applying a first layer of a first polymerizable composition onto the first or second molding surface, wherein the first polymerizable composition is free of any pigment particle and comprises at least one first photoinitiator,
      (b) irradiating the first layer of the first polymerizable composition with a UV/visible light to at least partially cure the first layer to form a first polymeric film on the first or second molding surface,
      (c) printing a colored image with at least one ink on the first polymeric film on the first or second molding surface, wherein the ink comprises at least one pigment particles, an actinically-crosslinkable siloxane-containing binder polymer, a second photoinitiator, and at least one diluent, wherein the actinically-crosslinkable siloxane-containing binder polymer is soluble in said at least one diluent and comprises 1st repeating units each having an ethylenically unsaturated group, $2^{nd}$ repeating units of at least one first hydrophilic vinylic monomer and $3^{rd}$ repeating units of at least one first siloxane-containing polymerizable component selected from the group consisting of a first siloxane-containing vinylic monomer, a first polysiloxane-containing vinylic crosslinker, and combinations thereon, (d) irradiating the printed colored image with a UV/visible light to cure the colored images on the first polymeric film on the first or second molding surface, (e) applying a second layer of a second polymerizable composition to completely cover the cured colored image on the first polymeric film, wherein the second polymerizable composition is free of any pigment particle and comprises at least one second photoinitiator, and (f) irradiating the second layer of the second polymerizable composition with a UV/visible light to at least partially cure the second layer to form the second polymeric film which, in combination with the first polymeric film, encapsulates the cured colored image;

(3) dispensing a third polymerizable composition into the lens-forming cavity of the mold, wherein the third polymerizable composition comprises (a) at least one second siloxane-containing polymerizable component selected from the group consisting of a second siloxane-containing vinylic monomer, a second polysiloxane containing vinylic crosslinker, and combinations thereof, (b) at least one second hydrophilic vinylic monomer, and (c) at least one thermal initiator, wherein the third polymerizable composition is in direct contact with and penetrates into the transferable, colored, and polymeric composite film on the first or second molding surface; and (4) thermally curing the third polymerizable composition within the lens-forming cavity for at least about 40 minutes to form the colored silicone hydrogel contact lens, whereby the transferable, colored, and polymeric composite film detaches from the first or second molding surface and becomes integral with the body of the silicone hydrogel contact lens.

2. The method of embodiment 1, wherein the transferable, colored and polymeric composite film is formed on the first molding surface.

3. The method of embodiment 1 or 2, wherein said at least one diluent comprises at least one organic solvent.

4. The method of embodiment 3, wherein said at least one organic solvent is selected from the group consisting of tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

5. The method of any one of embodiments 1 to 4, wherein the first and second polymerizable compositions independent of each other comprise the actinically-crosslinkable siloxane-containing binder polymer.

6. The method of any one of embodiments 1 to 5, wherein the first and second polymerizable compositions independent of each other comprises at least one third siloxane-containing polymerizable component and at least one third hydrophilic vinylic monomer, wherein said third siloxane-containing polymerizable component comprises at least one third siloxane-containing vinylic monomer, at least one third polysiloxane-containing vinylic crosslinker, or combinations thereof.

7. The method of any one of embodiments 1 to 6, wherein the first and second polymerizable compositions independent of each other comprises a non-silicone vinylic crosslinker having a (meth)acryloyl group and an ene group.

8. The method of embodiment 7, wherein the non-silicone vinylic monomer is: allyl (meth)acrylate; N-allyl (meth)acrylate; a coupling reaction product of an acrylic monomer having a first functional group selected from the group consisting of a primary group, a secondary amino group, an aziridine group, an azlactone group, a carboxyl group (i.e., —COOH), an epoxy group, an isocyanate group, and a hydroxyl group, with an ene monomer having a second functional group selected from the group consisting of a primary group, a secondary amino group, a carboxyl group (i.e., COOH), an epoxy group, an isocyanate group, and a hydroxyl group; or combinations thereof, wherein the first and second functional groups are different from each other but can react with each other in a coupling reaction to form a covalent linkage.

9. The method of embodiment 8, wherein the acrylic monomer is $C_2$ to $C_6$ hydroxyalkyl (meth)acrylate, $C_2$ to $C_6$ hydroxyalkyl (meth)acrylamide, amino-$C_2$-$C_6$ alkyl (meth)acrylamide, $C_1$-$C_6$ alkylamino-$C_2$-$C_6$ alkyl (meth)acrylamide, (meth)acrylic acid, $C_2$-$C_4$alkylacrylic acid (e.g., ethylacrylic acid, propylacrylic acid, butylacrylic acid), N-[tris(hydroxymethyl)-methyl]acrylamide, N,N-2-acrylamidoglycolic acid, 3-(acryloylxy)propanoic acid, N-hydroxysuccinimide ester of (meth)acrylic acid, glycidyl (meth)acrylate, $C_1$ to $C_6$ isocyanatoalkyl (meth)acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), aziridinyl $C_1$-$C_{12}$ alkyl (meth)acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), or combinations thereof, wherein the ene monomer is allylamine, 3-butenylamine, 4-pentenylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, 3-butenoic acid, 4-pentenoic acid, 5-hexenoic acid, 6-heptenoic acid, allyloxy glycidyl ether, 1,2-ppoxy-5-hexene, 3,4-epoxy-1-butene, 2-methyl-2-vinyloxirane, allyl isocyanate, 4-isocyanato-1-butene, allyl alcohol, allyloxyethanol, allyloxyethoxyethanol, allyloxyethoxyethoxyethanol, allyloxyethoxyethoxyethoxyethanol, allyloxypolyethylene glycol, 4-hydroxy-1-butene, 5-hydroxy-1-pentene, 4-hydroxy-1-pentene, 3-hydroxy-1-pentene, or combinations thereof.

10. The method of any one of embodiments 1 to 9, wherein the actinically-crosslinkable siloxane-containing binder polymer is obtained by reacting a siloxane-containing polymer with an ethylenically functionalizing vinylic agent which comprises an ethylenically unsaturated group and a third functional group, wherein the siloxane-containing polymer comprises repeating units each having a pendant fourth functional group, wherein the third and fourth functional groups are different from each other and coreactive with each other under coupling reactions to form a covalent linkage, wherein the third and fourth functional group are selected from the group consisting of a hydroxyl group (—OH), a primary amino group (—NH$_2$), a secondary amino group (—NHR$^O$ in which R$^O$ is H or $C_1$-$C_{10}$ alkyl), a carboxylic group (—COOH), an epoxy group, an aldehyde group (—CHO), an azlactone group, an aziridine group, an acid halide group (—COX, X=Cl, Br, or I), an isothiocyanate group, an isocyanate group, a halide group (—X, X=Cl, Br, or I), an acid anhydride group, and combinations thereof.

11. The method of embodiment 10, wherein the siloxane-containing polymer is a copolymerization product of a reactive composition which comprises: (a) at least one functional vinylic monomer having the fourth functional group, (b) at least one first hydrophilic vinylic monomer, (c) at least one first siloxane-containing polymerizable component selected from the group consisting of a first siloxane-containing vinylic monomer, a first polysiloxane-containing vinylic crosslinker, and combinations thereof, (d) a free radical initiator, and (e) optionally but preferably a chain-transfer agent (preferably a thiol-containing compound), in presence of an organic solvent.

12. The method of embodiment 10 or 11, wherein said at least one ethylenically functionalizing vinylic monomer and the functional vinylic monomer independent of each other are selected from the group consisting of $C_2$ to $C_6$ hydroxylalkyl (meth)acrylate, $C_2$ to $C_6$ hydroxyalkyl (meth)acrylamide, amino-$C_2$-$C_6$ alkyl (meth)acrylamide, $C_1$-$C_6$ alkylamino-$C_2$-$C_6$ alkyl (meth)acrylamide, (meth)acrylic acid, $C_2$-$C_4$ alkylacrylic acid (e.g., ethylacrylic acid, propylacrylic acid, butylacrylic acid), N-[tris(hydroxymethyl)-methyl]acrylamide, N,N-2-acrylamidoglycolic acid, 3-(acryloylxy)propanoic acid, (meth)acryloyl halides ($CH_2$=CH—COX or $CH_2$=CCH$_3$—COX, X=Cl or Br), N-hydroxysuccinimide ester of (meth)acrylic acid, glycidyl (meth)acrylate, $C_1$ to $C_6$ isocyanatoalkyl (meth)acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), aziridinyl $C_1$-$C_{12}$ alkyl (meth)acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), acetal-containing vinylic monomers (e.g., acrolein, methacrolein, crotonaldehyde, acrolein dimethyl acetal, acrolein diethyl acetal, methacrolein dimethyl acetal, methacrolein diethyl acetal, methyl vinyl ketone, 3-methyl-3-buten-2-one, 3-penten-2-one, ethyl vinyl ketone, propyl vinyl ketone, isopropyl vinyl ketone, vinyl butyl ketone, tert-butyl vinyl ketone, iso-butyl vinyl ketone, methyl allyl ketone, and combinations thereof), and combinations thereof.

13. The method of any one of embodiments 1 to 12, wherein the ink further comprises at least one polymeric dispersant selected from the group consisting of polyvinylpyrrolidone, alkylamino-functionalized polyethylene oxide and polypropylene oxides, polyoxyethylene alkylether polymers with a phosphate ester functionality, polyacrylic acid (PAA), polymethacrylic acid (PMAA), a homopolymer of vinylic monomer containing a dialkylamine group, a copolymer of vinylic monomer containing a dialkylamine group with another vinylic monomer, a homopolymer of a vinylic monomer containing a phosphate ester group, a copolymer of a vinylic monomer containing a phosphate ester group with another vinylic monomer, and combinations thereof (more preferably a polyvinylpyrrolidone, even more preferably a polyvinylpyrrolidone having a weight average of molecular weight of from 4000 to 20000).

14. The method of any one of embodiments 1 to 13, wherein the first, second and third siloxane-containing polymerizable components independent of one another comprise a vinylic monomer of formula (M1) or (M2)
in which: a1 is zero or 1; $R_0$ is H or methyl; $X_0$ is O or $NR_1$; $L_1$ is a $C_2$-$C_6$ alkylene divalent radical or a divalent radical of

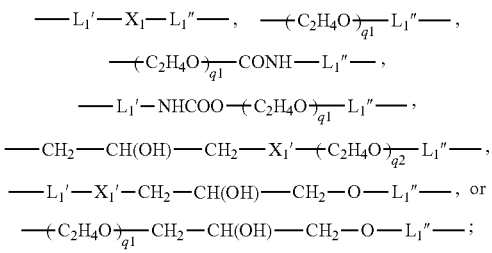

$L_{1'}$ is a $C_2$-$C_8$ alkylene divalent radical which has zero or one hydroxyl group; $L_{1''}$ is $C_3$-$C_8$ alkylene divalent radical which has zero or one hydroxyl group; $X_1$ is O, $NR_1$, NHCOO, OCONH, $CONR_1$, or $NR_1CO$; $R^1$ is H or a $C_1$-$C_4$ alkyl having 0 to 2 hydroxyl group; $R_{r1}$ and $R_{r2}$ independent of each other are a $C_1$-$C_4$ alkyl; $X_{1'}$ is O or $NR_1$; q1 is an integer of 1 to 20; q2 is an integer of 0 to 20; n1 is an integer of 3 to 25; and r1 is an integer of 2 or 3.

15. The method of any one of embodiments 1 to 14, wherein the first, second and third siloxane-containing polymerizable components independent of one another comprises a vinylic monomer selected from the group consisting of α-(meth)acryloxypropyl terminated ω—$C_1$-$C_4$-alkyl terminated polydimethylsiloxane, α-(meth)acryloxy-2-hydroxypropyloxypropyl terminated ω—$C_1$-$C_4$-alkyl terminated polydimethylsiloxane, α-(2-hydroxyl-methacryloxypropyloxypropyl)-ω—$C_1$-$C_4$-alkyl-decamethylpentasiloxane, α-[3-(meth)acryloxyethoxy-2-hydroxypropyloxypropyl]-terminated ω—$C_1$-$C_4$-alkyl terminated polydimethylsiloxane, α-[3-(meth)acryloxy-propyloxy-2-hydroxypropyloxypropyl]-terminated ω—$C_1$-$C_4$-alkyl terminated polydimethylsiloxane, α-[3-(meth)acryloxyisopropyloxy-2-hydroxypropyloxypropyl]-terminated ω—$C_1$-$C_4$-alkyl terminated polydimethylsiloxane, α-[3-(meth)acryloxybutyloxy-2-hydroxypropyloxypropyl]-terminated ω—$C_1$-$C_4$-alkyl terminated polydimethylsiloxane, α-[3-(meth)acryloxy-ethylamino-2-hydroxypropyloxypropyl]-terminated ω—$C_1$-$C_4$-alkyl terminated polydimethylsiloxane, α-[3-(meth)acryloxypropylamino-2-hydroxypropyloxypropyl]-terminated ω—$C_1$-$C_4$-alkyl terminated polydimethylsiloxane, α-[3-(meth)acryloxy-butylamino-2-hydroxypropyloxypropyl]-terminated ω—$C_1$-$C_4$-alkyl terminated polydimethylsiloxane, α-(meth)acryloxy(polyethylenoxy)-2-hydroxypropyloxypropyl]-terminated ω—$C_1$-$C_4$-alkyl terminated polydimethylsiloxane, α-[(meth)acryloxy-2-hydroxypropyloxy-ethoxypropyl]-terminated ω—$C_1$-$C_4$-alkyl terminated polydimethylsiloxane, α-[(meth)acryloxy-2-hydroxypropyl-N-ethylaminopropyl]-terminated ω—$C_1$-$C_4$-alkyl terminated polydimethylsiloxane, α-[(meth)acryloxy-2-hydroxypropyl-aminopropyl]-terminated ω—$C_1$-$C_4$-alkyl terminated polydimethylsiloxane, α-[(meth)acryloxy-2-hydroxypropyloxy-(polyethylenoxy)propyl]-terminated ω—$C_1$-$C_4$-alkyl terminated polydimethylsiloxane, α-(meth)acryloylamidopropyloxypropyl terminated ω—$C_1$-$C_4$-alkyl terminated polydimethylsiloxane, α-N-methyl-(meth)acryloylamidopropyloxypropyl terminated ω—$C_1$-$C_4$-alkyl terminated polydimethylsiloxane, α-[3-(meth)acrylamidoethoxy-2-hydroxypropyloxy-propyl]-terminated ω—$C_1$-$C_4$-alkyl polydimethylsiloxane, α-[3-(meth)acrylamidopropyloxy-2-hydroxypropyloxypropyl]-terminated ω—$C_1$-$C_4$-alkyl terminated polydimethylsiloxane, α-[3-(meth)acrylamidoisopropyloxy-2-hydroxypropyloxypropyl]-terminated ω—$C_1$-$C_4$-alkyl terminated polydimethylsiloxane, α-[3-(meth)acrylamidobutyloxy-2-hydroxypropyloxypropyl]-terminated ω—$C_1$-$C_4$-alkyl terminated polydimethylsiloxane, α-[3-(meth)acryloylamido-2-hydroxypropyloxypropyl] terminated ω—$C_1$-$C_4$-alkyl polydimethylsiloxane, α-[3-[N-methyl-(meth)acryloylamido]-2-hydroxypropyloxypropyl]terminated ω—$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra (dimethylsiloxy)dimethylbutylsilane, α-vinyl carbonate-terminated ω—$C_1$-$C_4$-alkyl-terminated polydimethylsiloxanes, α-vinyl carbamate-terminated ω—$C_1$-$C_4$-alkyl-terminated polydimethylsiloxane, and combinations thereof.

16. The method of any one of embodiments 1 to 15, wherein the first, second and third siloxane-containing polymerizable components independent of one another comprises a vinylic monomer selected from the group consisting of tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl] (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl] (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)-propyloxy)propyl] (meth)acrylamide, N,N-bis[2-hydroxy-3-(3-(tris(trimethylsilyloxy)silyl)-propyloxy)propyl]-2-methyl (meth)acrylamide, N,N-bis[2-hydroxy-3-(3-(tris(trimethylsilyloxy)-silyl)propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris (trimethylsiloxy)silyl]propyl allyl carbamate, 3-[tris(trimethylsiloxy)silyl]propyl vinyl carbonate, and combinations thereof.

17. The method of any one of embodiments 1 to 16, wherein the first, second and third siloxane-containing polymerizable components independent of one another comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethyl-amino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, combinations thereof.

18. The method of any one of embodiments 1 to 16, wherein the first, second and third siloxane-containing polymerizable components independent of one another comprises a vinylic crosslinker of any one of formula (1) to (7)

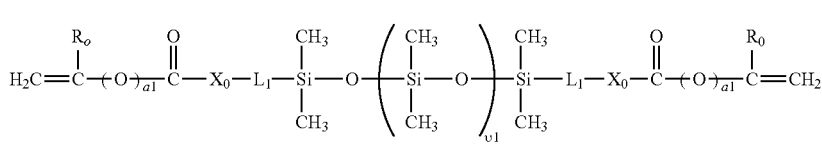

(1)

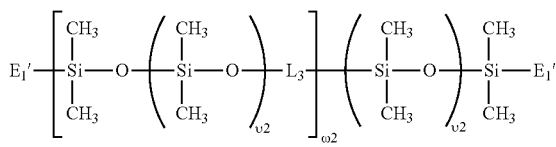

(2)

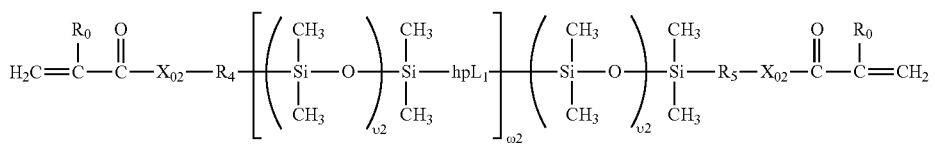

(3)

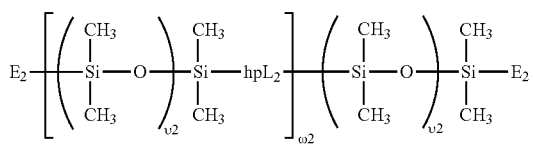

(4)

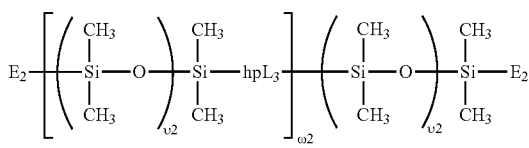

(5)

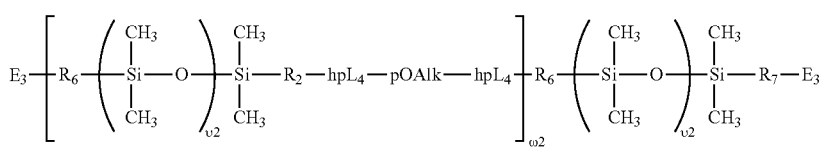

(6)

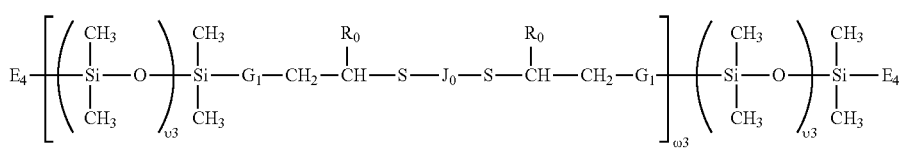

(7)

in which:
v1 is an integer of from 30 to 500;
v2 is an integer of from 5 to 50;
v3 is an integer of from 5 to 100;
ω2 and ω3 independent of each other are an integer of from 1 to 15;
a1 and g1 independent of each other is zero or 1;
h1 is an integer of 1 to 20 and h2 is an integer of 0 to 20;
m1 and m3 independent of each other is 0 or 1, m2 is an integer of 1 to 6, m4 is an integer of 1 to 5, m5 is 2 or 3;
q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
x+y is an integer of from 10 to 30;
e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
$R_o$ is H or methyl;
$R_1$, $R_{1n}$, $R_{2n}$, $R_{3n}$, and $R_{4n}$ independent of one another are H or a $C_1$-$C_4$ alkyl having 0 to 2 hydroxyl group;
$R_{n5}$ is H or a $C_1$-$C_{10}$ alkyl;
$R_2$ is a $C_4$-$C_{14}$ hydrocarbon divalent radical;
$R_3$ is a $C_2$-$C_6$ alkylene divalent radical;
$R_4$ and $R_5$ independent of each other are a $C_1$-$C_6$ alkylene divalent radical or a $C_1$-$C_6$ alkylene-oxy-$C_1$-$C_6$ alkylene divalent radical;
$R_6$ and $R_7$ independent of each other are a $C_1$-$C_6$ alkylene divalent radical or a $C_1$-$C_6$ alkoxy-$C_1$-$C_6$ alkylene divalent radical;
$R_8$ and $R_9$ independent of each other are a substituted or unsubstituted $C_1$-$C_{12}$ alkylene divalent radical;
$X_o$, $X_{1'}$, $X_{01}$, $X_{02}$, and $X_{03}$ independent of one another are O or $NR_1$;
$X_1$ is O, $NR_1$, NHCOO, OCONH, $CONR_1$, or $NR_1CO$;
$X_{o4}$ is —COO— or —$CONR_{n5}$—;
$X_{o5}$ and $X_{o7}$ independent of each other are a direct bond, —COO— or —$CONR_5$—;
$X_{o6}$ is a direct bond, a $C_1$-$C_6$ alkylene divalent radical, a $C_1$-$C_6$ alkylenoxy divalent radical, —COO—, or —$CONR_{n5}$—;
$X_{o8}$ is a direct bond or —COO—;
$X_{o9}$ is O or $NR_{n5}$;
$X_{10}$ is a direct bond, a $C_1$-$C_6$ alkylene divalent radical, —COO—, or —$CONR_{n5}$—;

$E_{1'}$ is a monovalent radical of

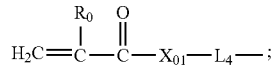

$E_2$ is a monovalent radical of

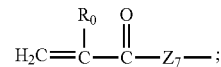

$E_3$ is a monovalent radical of

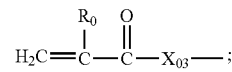

$E_4$ is a monovalent radical of

$L_1$ is a $C_2$-$C_8$ alkylene divalent radical or a divalent radical of -$L_1$'$X_1$-$L_1$''',

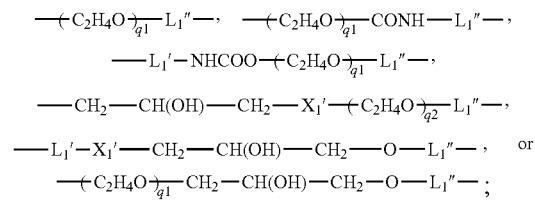

$L_{1'}$ is a $C_2$-$C_8$ alkylene divalent radical which has zero or one hydroxyl group;
$L_{1''}$ is $C_3$-$C_8$ alkylene divalent radical which has zero or one hydroxyl group;
$L_3$ is a divalent radical of

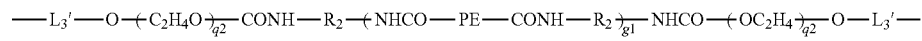

in which PE is a divalent radical of

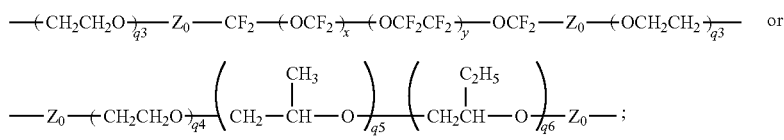

$L_{3'}$ is $C_3$-$C_8$ alkylene divalent radical;
$L_4$ is a divalent radical of

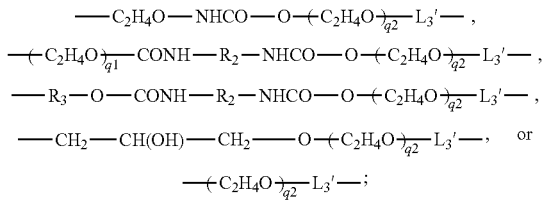

$hpL_1$ is a divalent radical of

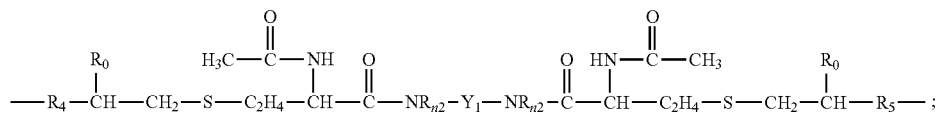

$hpL_2$ is a divalent radical of

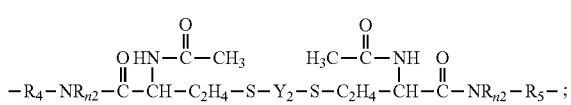

$hpL_3$ is a divalent radical of

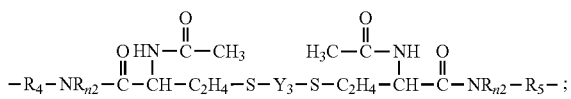

$hpL_4$ is a divalent radical of

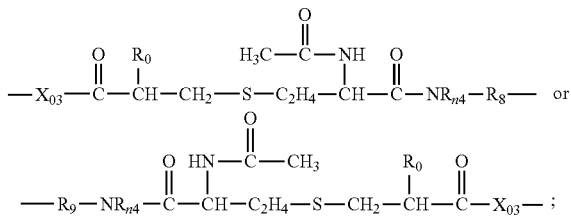

pOAlk is a divalent radical of

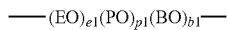

in which EO is an oxyethylene unit ($-CH_2CH_2-$), PO is an oxypropylene unit

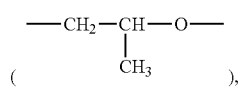

and BO is an oxybutylene unit

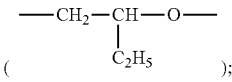

$M_0$ is $C_3$-$C_8$ alkylene divalent radical;
$M_1$ is a $C_4$-$C_{14}$ hydrocarbon divalent radical;
$M_2$ and $M_3$ independent of each other are a $C_1$-$C_8$ alkylene divalent radical;
$J_0$ is a $C_1$-$C_{12}$ hydrocarbon radical having 0 to 2 hydroxyl or carboxyl groups;
G1 is a direct bond, a $C_1$-$C_4$ alkylene divalent radical, or a bivalent radical of

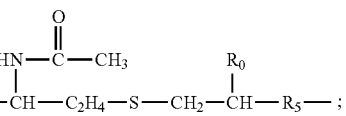

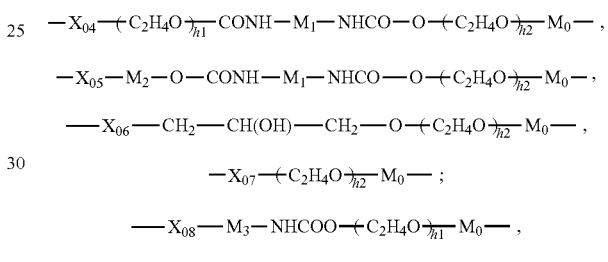

in which $M_0$ is linked to Si atom while $X_{04}$ to $X_{10}$ are linked to the group of $-CH_2-$ in formula (7) and at least one of $J_0$ and G1 in formula (7) comprises at least one moieties selected from the group consisting of hydroxyl groups, urethane linkage of $-OCONH-$, amino groups of $-NHR°$, amino linkages of $-NH-$, amide linkages of $-CONH-$, carboxyl groups, and combinations thereof;

$G_2$ is a $C_1$-$C_4$ alkylene divalent radical or a bivalent radical of

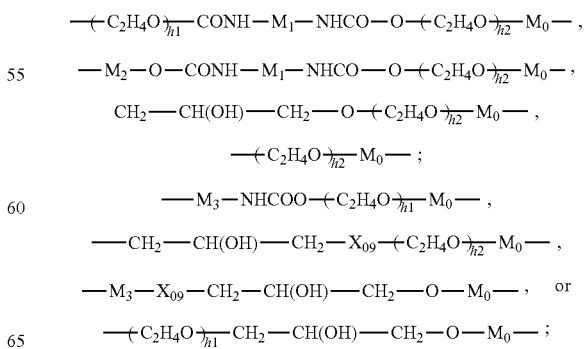

$G_3$ is a divalent radical of

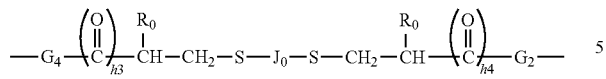

in which h3 and h4 independent of each other are 1 or 0;

G4 is a divalent radical of any one of (a) —NR$_{3'}$— in which R$_{3'}$ is hydrogen or $C_1$-$C_3$ alkyl, (b)

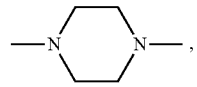

(c) —NR$_0$-G$_5$-NR$_0$— in which $G_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which $G_6$ is a $C_1$-$C_6$ alkylene divalent radical, a divalent radical of

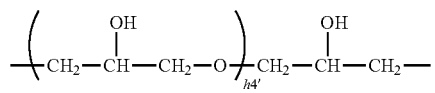

in which h4' is 1 or 2, a divalent radical of

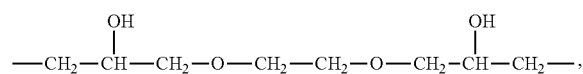

a divalent radical of

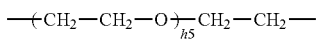

in which h5 is an integer of 1 to 5, a divalent radical of

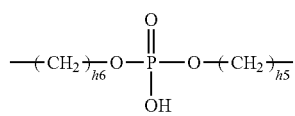

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

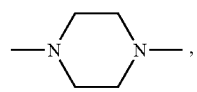

or a divalent radical of

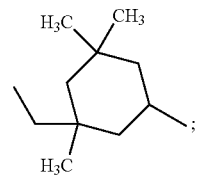

$Y_2$ is a divalent radical of

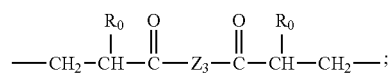

$Y_3$ is a divalent radical of

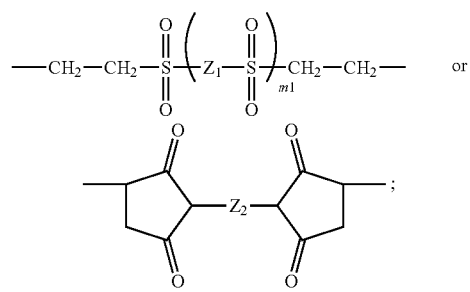

$Z_0$ is a direct bond or a $C_1$-$C_{12}$ alkylene divalent radical;
$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
$Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical,
$Z_3$ is a divalent radical of any one of (a) —NR$_{n3}$—, (b)

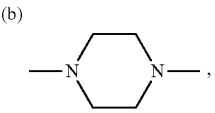

(c) —NR$_0$—Z$_5$—NR$_0$—, and (d) —O—Z$_6$—O—,
$Z_4$ is a $C_1$-$C_6$ alkylene divalent radical,
$Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical,
$Z_6$ is (a) a $C_1$-$C_6$ alkylene divalent radical, (b) a divalent radical of

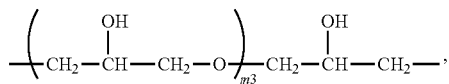

-continued

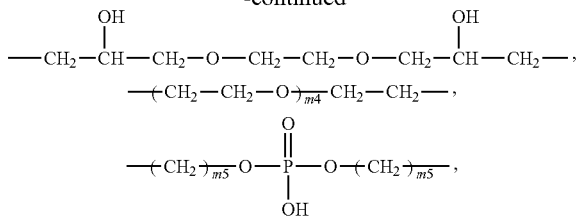

or (c) a substituted $C_3$-$C_8$ alkylene divalent radical having a hydroxyl group or phosphonyloxy group, $Z_7$ is a divalent radical of

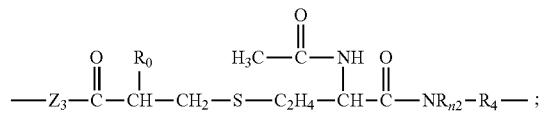

and $Z_8$ is a divalent radical of

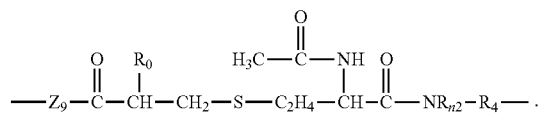

19. The method of any one of embodiments 1 to 16, wherein the first, second and third siloxane-containing polymerizable components independent of one another comprises a vinylic crosslinker of formula (I)

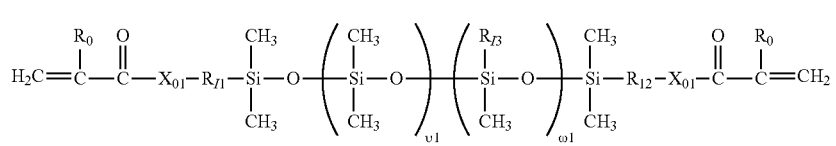

in which:
v1 is an integer of from 30 to 500 and ω1 is an integer of from 1 to 75, provided that ω1/v1 is from about 0.035 to about 0.15 (preferably from about 0.040 to about 0.12, even more preferably from about 0.045 to about 0.10);

$X_{01}$ is O or $NR_N$ in which $R_N$ is hydrogen or $C_1$-$C_{10}$-alkyl;
$R_o$ is hydrogen or methyl;
$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;
$R_{I3}$ is a monovalent radical of any one of formula (Ia) to (Ie)

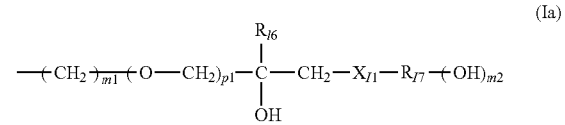

-continued (Ib) (Ic) (Id) (Ie)

p1 is zero or 1; m1 is an integer of 2 to 4; m2 is an integer of 1 to 5; m3 is an integer of 3 to 6; m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydromethyl;
$R_{I11}$ is hydroxyl or methoxy;
$X_1$ is a sulfur linkage of —S— or a tertiary amino linkage of —$NR_{I12}$— in which $R_{I12}$ is $C_1$-$C_1$ alkyl, hydroxyethyl, hydroxypropyl, or 2,3-dihydroxypropyl; and
$X_{I2}$ is an amide linkage of

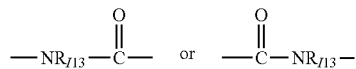

in which $R_{I13}$ is hydrogen or $C_1$-$C_{10}$ alkyl.

20. The method of any one of embodiments 1 to 19, wherein the first, second and third polymerizable compositions independent of one another comprises an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

21. The method of any one of embodiments 1 to 20, wherein the first, second and third polymerizable compositions independent of one another comprises a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

22. The method of any one of embodiments 1 to 21, wherein the first, second and third polymerizable compositions independent of one another comprises an amino-containing acrylic monomer and/or a carboxyl-containing monomer, wherein the amino-containing vinylic monomer is selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof, wherein the carboxyl-containing acrylic monomer is selected from the group consisting of 2-(meth)acrylamidoglycolic acid, (meth)acrylic acid, ethylacrylic acid, and combinations thereof.

23. The method of any one of embodiments 1 to 22, wherein the first, second and third polymerizable compositions independent of one another comprises an acrylic monomer selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth) acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof.

24. The method of any one of embodiments 1 to 23, wherein the third polymerizable composition comprises at least one hydrophilic N-vinyl amide monomer and at least one hydrophilic acrylic monomer.

25. The method of embodiment 24, wherein the hydrophilic N-vinyl amide monomer is selected from the group consisting of N-vinylpyrrolidone, N-vinyl-N-methyl acetamide, and combinations thereof.

26. The method of embodiment 24 or 25, wherein the hydrophilic acrylic monomer is selected from the group consisting of N,N-dimethyl (meth)acrylamide, (meth) acrylamide, N-hydroxyethyl (meth)acrylamide, N-hydroxypropyl (meth)acrylamide, hydroxyethyl methacrylate, glycerol methacrylate (GMA), di(ethylene glycol) (meth)acrylate, tri(ethylene glycol) (meth)acrylate, tetra (ethylene glycol) (meth)acrylate, poly(ethylene glycol) (meth)acrylate having a number average molecular weight of up to 1200, poly(ethylene glycol)ethyl (meth) acrylamide having a number average molecular weight of up to 1200, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, polyethylene glycol (meth)acrylate having a number average molecular weight of up to 1200, polyethylene glycol $C_1$-$C_4$-alkyl ether (meth)acrylate having a number average molecular weight of up to 1200, N-[tris(hydroxymethyl)methyl]-acrylamide, (meth)acrylic acid, ethylacrylic acid, 2-(meth)acrylamidoglycolic acid, a phosphorylcholine-containing vinylic monomer, and combinations thereof (more preferably from the group consisting of N,N-dimethyl (meth)acrylamide, hydroxyethyl (meth)acrylate, N-hydroxyethyl (meth)acrylamide, glycerol methacrylate (GMA), di(ethylene glycol) (meth)acrylate, tri(ethylene glycol) (meth)acrylate, tetra(ethylene glycol) (meth) acrylate, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, and combinations thereof).

27. The method of any one of embodiments 1 to 26, wherein at least one of the first, second, and third polymerizable compositions comprises a hydrophobic acrylic monomer selected from the group consisting of methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, and combinations thereof.

28. The method of any one of embodiments 1 to 27, wherein the third polymerizable composition comprises: (a) from about 15% to about 55% (preferably from about 20% to about 50%, even more preferably from about 25% to about 45%) by weight of said at least one first siloxane-containing polymerizable component; (b) from about 35% to about 65% (preferably from about 40% to about 65%, more preferably from about 45% to about 65%) by weight of said at least one first hydrophilic vinylic monomer; (c) from about 2.0% or less (preferably about 1.5% or less, more preferably from about 0.1% to about 1.2%) by weight of at least one non-silicone vinylic crosslinkers; (d) from about 5% to about 15% (preferably from about 6% to about 14%, more preferably from about 7% to about 13%, even more preferably from about 8% to about 12%) by weight of at least one hydrophobic acrylic monomer; (e) from 0 to about 16% (preferably from 0 to about 14%, more preferably from 0 to about 12%) by weight of at least one organic solvent; and (f) from about 0.1% to about 2.0% (preferably from about 0.2% to about 1.75%, more preferably from about 0.3% to about 1.5%, even more preferably from about 0.4% to about 1.25%) by weight of said at least one thermal free radical initiator, relative to the total amount of all polymerizable components in the polymerizable composition, provided that the sum of the amounts of components (a) to (f) and other not-listed polymerizable components is 100%.

29. The method of any one of embodiments 1 to 28, wherein the colored image is printed on the first polymeric film by using an inkjet printing system.

30. The method of any one of embodiments 1 to 28, wherein the colored image is printed on the first polymeric film by using a pad-transfer printing system.

31. The method of any one of embodiments 1 to 30, wherein step (4) is carried out in an oven at a temperature of from 40° C. to 100° C. for a period of time of from about 1 to about 24 hours (preferably from about 1 to about 12 hours).

32. A colored silicone hydrogel contact lens obtained according to the method of any one of embodiments 1 to 31.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Chemicals

The following abbreviations are used in the following examples: DMA represents N,N-dimethyl acrylamide; IEM represents 2-isocyanatoethyl methacrylate; HEMA represents 2-hydroxyethyl methacrylate; DBTDL represents dibutyltindilaurate; NVP represents N-vinylpyrrolidone; MMA represents methyl methacrylate; TEGDMA represent triethyleneglycol dimethacrylate; EGMA represents ethylene glycol methyl ether methacrylate; AMA represents allyl methacrylate; V64 represents 2,2'-dimethyl-2,2'azodipropiononitrile; V88 represents 1,1'-Azobis(cyanocyclohexane) which has a 10-hour half-life temperature of 88° C.; VAZO-52 represents 2-2'-Azobis(2,4-dimethylvaleronitrile); Darocur 1173 represents 2-Hydroxy-2-methyl-1-phenyl-1-propanone; Darocur TPO represents 2,4,6-Trimethylbenzoyl-diphenyl-phosphineoxide; Darocur 4265 represents a mixture of Darocur 1173 (50 wt %) and Darocur TPO (50 wt %); Norbloc is 2-[3-(2H-Benzotriazol-2-yl)-5-hydroxyphenyl]ethyl methacrylate; RB247 is Reactive Blue 247; TAA represents tert-amyl alcohol; PrOH represents 1-propanol; IPA represents isopropanol; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; D6 represents monobutyl-terminated monomethacryloxypropyl-terminated polydimethylsiloxane (M.W. 700 to 800 g/mol from Shin Etsu); "G1" macromer represents a di-methacryloyloxypropyl-terminated polysiloxane (Mn 7.5-8.1K g/mol, OH content~1.25-1.55 mmol/g) of formula (A) shown above; "G4" macromer represents a di-methacryloyloxypropyl-terminated polysiloxane (Mn~13.5K g/mol, OH content~1.8 meq/g) of formula (A) shown above; Betacon is a dimethacrylate-terminated chain-extended polydimethylsiloxane (Mn~5000 g/mol), which has two polydimethylsiloxane (PDMS) segments separated by one perfluoropolyether (PFPE) via diurethane linkages between PDMS and PFPE segments and two urethane linkages each located between one terminal methacrylate group and one PDMS segment, is prepared according to method similar to what described in Example B-1 of U.S. Pat. No. 5,760,100.

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine the average % transmission (i.e., Luminescence % T) between 380 nm and 780 nm.

Example 2

This example illustrates how to prepare binder polymers (actinically-crosslinkable polymers), inks, and polymerizable compositions suitable for use in the present invention.

Preparation of Siloxane-Containing Binder Polymer ("Binder Polymer")

The binder polymer is a silicone hydrogel copolymer and prepared according to a 2-step process as described in Example 2 of U.S. Pat. Appl. Pub. No. 2017-0183520A1. In the first step, a reactive mixture of DMA (38.53 weight unit parts), TRIS (24.49 weight unit parts), HEMA (10.10 weight unit parts), Betacon (21.47 weight unit parts), VAZO-52 (weight unit parts), and 2-mercaptoethanol (1.38 weight unit parts) in ethyl acetate (158 weight unit parts) as solvent are copolymerized. The copolymerization reaction is carried out under nitrogen in ethyl acetate at 50° C. for about 24 hours. In this process VAZO-52 is used to initiate the polymerization while 2-mercaptoethanol is used as a chain transfer agent. The 2-mercaptoethanol chain transfer agent regulates molecular weight and prevents gelation during the polymerization process.

In the second step, IEM (3.43 weight unit parts) and DBTDL (0.08 Weight unit parts) are added to ethylenically functionalize the copolymer produced above to render it actinically-crosslinkable. The DBTDL catalyzes the reaction of the isocyanate groups of IEM with the hydroxy groups of HEMA units in the copolymer produced in step 1. Once the reaction of IEM is complete, the ethyl acetate is exchanged with PrOH and the solution is then concentrated to a solid content of 65-70 wt. %.

Preparation of Pigmented Inks

Ink preparation consists of mixing the appropriate pigment grinds in appropriate amounts depending on the final ink color with the binder solution, the photoinitiator (Darocur 1173 or 4265) and the solvent (PrOH). The inks are homogenized using a Flacktek speed mixer at 3500 rpm for 2-5 minutes.

Prior to incorporation into inks, pigment grinds are prepared by wet ball milling in PrOH. Corundum beads inside jar made of same are used to grind the pigment in the solvent to reduce particle size. The resulting grind is added to the ink in the appropriate amount to obtain the desired % pigment.

For example, a black iron oxide grind is prepared by addition of 240 g of the pigment to a milling jar with 500-1000 g of ½" alumina beads along with 360 g of PrOH. The jar is sealed and rolled at 250 rpm on a roller mill for 24-72 hours. The grind or pigment dispersion is collected and % solids measured gravimetrically. The black ink recipe is shown in Table 1.

TABLE 1

| | Black iron oxide | Binder Polymer | Darocur 1173 | PrOH |
|---|---|---|---|---|
| Target wt. % | 12 | 38 | 1 | 49 |

To make other color inks, the appropriate pigment(s) are ground up as described above and added to the ink to make the desired compositions. Pure Hazel (Table 2) and Dark Hazel (Table 3) recipes are shown below:

TABLE 2

| | Yellow iron oxide | Binder Polymer | Darocur 4265 | PrOH |
|---|---|---|---|---|
| Target wt. % | 9 | 32 | 4 | 55 |

TABLE 3

| Component | Target % |
|---|---|
| Yellow Iron Oxide | 5.66 |
| Red Iron Oxide | 2.36 |

TABLE 3-continued

| Component | Target % |
|---|---|
| Titanium Dioxide | 0.91 |
| Copper Phthalocyanine Blue | 0.07 |
| Binder Polymer | 32 |
| Darocur 4265 | 4 |
| PrOH | 55 |

Preparation of Polymerizable Composition I ("Clear 1")

The first clear layer is printed on the surface of the polypropylene mold in a donut shape to provide a bottom encapsulation of the pigmented prints. It also helps anchor the pigmented dots on top to prevent lateral migration and smearing during lens cure. The polymerizable composition I ("Clear 1") for forming the first clear layer can be polymerizable by ultraviolet radiation and has the composition shown in Table 4.

TABLE 4

| Component | Amount (%) |
|---|---|
| Binder Polymer | 38 |
| G4 | 10 |
| Darocur 1173 | 0.5 |
| PrOH | 51.5 |

Preparation of Polymerizable Composition II ("Clear 2")

The top clear layer is printed on the printed dots in a donut shape to provide a top encapsulation to prevent smearing. The polymerizable composition II ("Clear 2") for forming the top clear layer can be polymerizable by ultraviolet radiation and has the composition shown in Table 5.

TABLE 5

| Component | Amount (wt. %) |
|---|---|
| Binder Polymer | 32.1 |
| G4 | 8.45 |
| Darocur 1173 | 0.5 |
| PrOH | 58.95 |

Preparation of Polymerizable Composition III (i.e., SiHy Lens Formulation)

The lens formulation is prepared using the ingredients shown in Table 6. All materials are sequentially added at room temperature and then mixed using magnetic stirring until all components are dissolved.

TABLE 6

| Ingredient | Wt. % |
|---|---|
| D6 | 33.04 |
| G1 | 5.83 |
| NVP | 38.87 |
| MMA | 8.75 |
| EGMA | 9.91 |
| TEGDMA | 0.29 |
| AMA | 0.10 |
| Norbloc | 1.75 |
| Vazo 64 | 0.49 |
| TAA | 0.97 |

Example 3

Preparation of PAA Aqueous Solution

An aqueous solution of polyacrylic acid (PAA) is prepared by adding adequate amount of PAA in water (distilled or deionized water). After PAA is fully dissolved, the pH is adjusted by adding ~1.85% formic acid to the PAA aqueous solution to about 2. The target concentration of PAA is about 0.1% by weight. The prepared PAA aqueous solution is filtered to remove any particulate or foreign matter.

Phosphate Buffered Saline (PBS)

A phosphate buffered saline is prepared by dissolving $NaH_2PO_4.H_2O$, $Na_2HPO_4.2H_2O$, and in a given volume of purified water (distilled or deionized) to have the following composition: ca. 0.044 w/w % $NaH_2PO_4.H_2O$, ca. 0.388 w/w/% $Na_2HPO_4.2H_2O$, and ca. 0.79 w/w % NaCl.

In-Package-Coating Saline (IPC Saline)

IPC saline is prepared as follows. Poly(AAm-co-AA)(90/10) partial sodium salt, poly(AAm-co-AA) 90/10, Mw 200,000) is purchased from Polysciences, Inc. and used as received. Kymene or PAE solutions of different solid contents is purchased from Ashland as an aqueous solution and used as received. 0.132 w/w % of PAAm-PAA and about 0.11 w/w % of PAE is mixed together in PBS and pre-treated at 65° C. for about 6 hr. After the heat pre-treatment, the IPC saline is cooled down back to room temperature. Up to 5 ppm hydrogen peroxide maybe added to the final IPC saline to prevent bioburden growth and the IPC saline is filtered using a 0.22 micron membrane filter.

Example 4

This example illustrates how to make colored silicone hydrogel contact lenses according to a preferred embodiment of a method of the invention.

A transferable colored polymeric composite film, which consists essentially of a first polymeric film, a second polymeric film and a cured colored image encapsulated therewithin, are formed on the molding surface of a male mold half as illustrated in FIG. 1. Any suitable pad printing system known to a person skilled in the art can be used in the formation of a transferable colored polymeric composite film. A preferred pad printing system, which comprising a silicone pad, a metal or ceramic cliche (printing plate), an ink supply system capable of controlling the temperature, viscosity and colorant concentration of an ink in a closed ink cup with blade doctors as illustrated in FIG. 2, is used.

Figure 2:
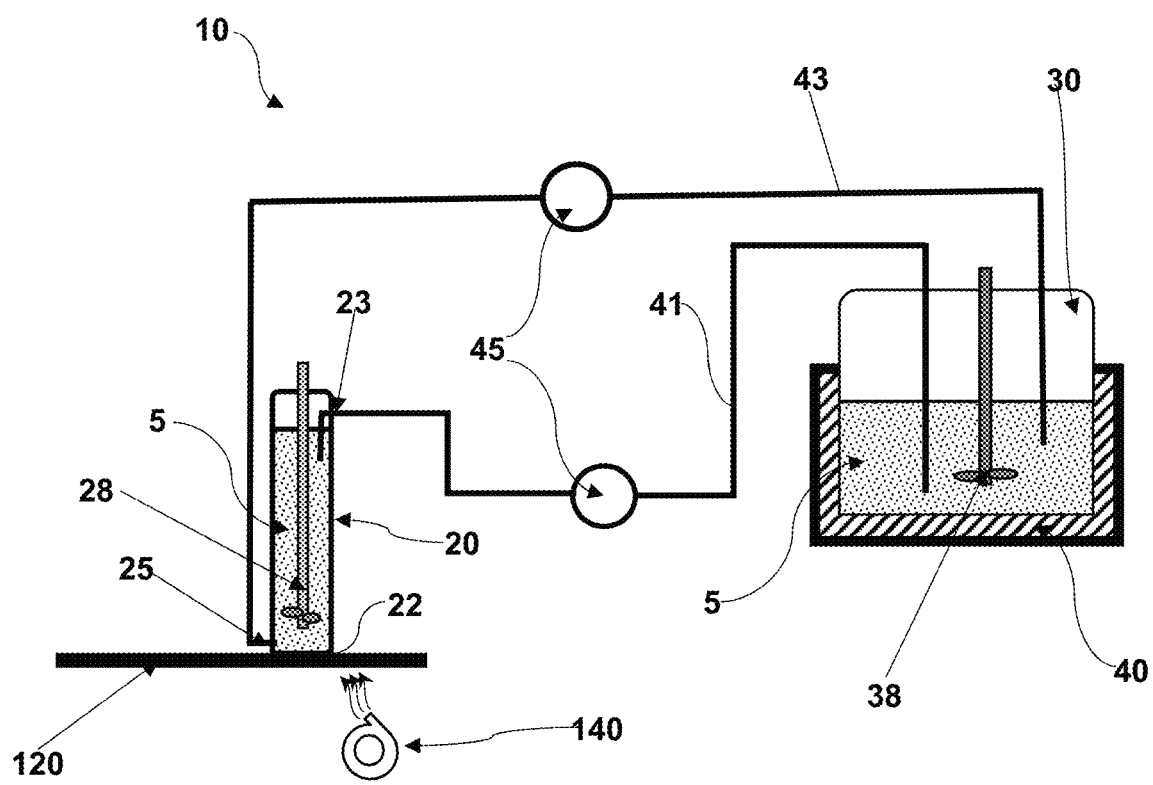
FIG. 2 illustrates schematically a pad printing instrument comprising a preferred ink supply system.

FIG. 2 illustrates schematically an ink supply system (10) of the invention. The system comprises: an ink cup (20); an ink container (30); a thermostat (40); a first flow conduit (41); and a second flow conduit (43).

The ink cup (20) comprises: a cylindrical hollow structure defining an ink reservoir for holding the ink (5) and defining an outer edge (22); an ink cup inlet (23); an ink cup outlet (25); and a stirrer (28) for continuously mixing the ink in the ink cup. The cylindrical hollow structure typically has a length (e.g., about 40 mm to about 120 mm) sufficient for containing a sufficient amount of the ink (5) for printing a desired number (e.g., 5000) of contact lenses or molds. The temperature of the ink in the ink cup is from about 20° C. to about 30° C. The diameter of the cylindrical hollow structure should be larger than the image pattern engraved on the flat surface of the printing plate or so-called cliché (120) and typically is at least about 15 mm. The outer edge (22) has a scraping element thereon for engaging the printing plate (120). In operation, the ink cup (20) is inverted and held against the flat surface (having the engraved image pattern) of the printing plate (120).

The ink container (30) contains the ink (5), which differs from the ink in the ink cup only in temperature. The ink in the ink container has a temperature being at least about 5° C. (preferably at least about 10° C.) lower than the temperature of the ink in the ink cup. The thermostat (40) maintains the temperature of the ink in the ink container. The stirrer (38) mixing continuously the ink in the ink container.

The first flow conduit (41) extends between the ink container (30) and the ink cup inlet (23) for providing a flow of the cold ink from the ink container (30) to the ink cup (20) so as to compensate heat generated by friction between the ink cup (20) and the printing plate (120) during operation.

The second flow conduit (43) extends between the ink container (30) and the ink cup outlet (25) for providing a flow of the ink having the first temperature from the ink cup to the ink container. The flow of the ink (5) between the ink cup (20) and the ink container (30) are carried out by using pumps (45) as known to a person skilled in the art. The first flow conduit (41) operates continuously to feed the cold ink into the ink cup at a flow rate (ml of ink per second) which is equal to or slightly lower than consumption rate of the ink (i.e., ml of ink inked to the engraved image pattern per second), while the second flow conduit (43) operates occasionally on demand to ensure no overflow the ink cup. Alternatively, the first flow conduit (41) and the second flow conduit (43) continuously operates in synchrony with each other to ensure no net increase in ink level in the ink cup.

The printing plate (120) can be indirectly cooled with a cooling device or a cold air blower (140) (such as, a VORTEC Cold Air Gun) by blowing cold air onto the back side of the printing plate (120). The effects of heat generated by the friction between the printing plate and the ink cup upon the temperature of the printing plate can be minimized.

In operation, as the ink cup (20) passes or travels over the image pattern engraved in the printing plate (120), the engraved image pattern is flooded with ink (5). At the same time that the engraved image pattern is flooded with the ink, a doctor blade (e.g., a rim or lip of the ink cup) scrapes (wipes of) excess ink from the printing plate back into the ink cup (20) as the printing plate moves underneath the ink cup (20), leaving ink only in the grooves forming the image. Then, a flexible silicone pad (no shown) picks up the inked image from the printing plate and transfers the image to a contact lens or a mold.

As shown in FIG. 1, a first clear coat (101) of a donut shape is first applied onto the molding surface of the male mold half (100) by using a pad printing system of FIG. 2 to print a donut shape with the first polymerizable composition prepared in Example 2. The first clear coat (101) is cured with UV light for about 1-5 seconds prior to subsequent prints.

A first color image (102) is printed onto the cured first clear coat (101) on the molding surface of the male mold half (100) with a Pure Hazel ink prepared in Example 2; a second color image (103) is printed onto the cured first clear coat (101) on the molding surface of the male mold half (100) with a Dark Hazel ink prepared in Example 2; and a third color image (104) is printed onto the cured first clear coat (101) on the molding surface of the male mold half (100) with a Black ink prepared in Example 2, by using a pad printing system of FIG. 2 prior to print a donut shape. The printed colored images are cured with UV light for about 1-5 seconds prior to printing a second clear coat (105).

The second clear coat (105) is applied onto the cured first clear coat (101) with the cured color images thereon on the molding surface of the male mold half (100) by using a pad printing system of FIG. 2 to print a donut shape with the second polymerizable composition prepared in Example 2. The second clear coat (105) is cured with UV light for about 1-5 seconds prior to dispensing the silicone hydrogel lens formulation (the third polymerizable composition).

All UV curing is carried out with a Fusion 1300 UV system with a D-bulb.

A silicone hydrogel lens formulation is dispensed in a female mold half. The male mold half with the transferable colored polymeric composite film thereon is closed onto the female mold half to form a closed mold with the silicone hydrogel lens formulation therewithin. The closed mold is placed in an oven and the silicone hydrogel lens formulation within the closed mold is cured at temperatures ranging from 25–105° C. under a constant flow of nitrogen for 1.5-3 hours, to form colored silicone hydrogel contact lenses.

Following thermal cure, the lenses are separated from the mold and extracted. The extracted lens can undergo a surface treatment as follows.

After de-molding and delensing, colored silicone hydrogel contact lenses are placed in plastic trays. Then the trays with lenses are immersed in the PAA solution prepared in Example 3 for a about 2 hours and then immersed in PBS prepared in Example 3 for about 5 minutes to one hour at room temperature for forming PAA-coated SiHy lenses. Adequate agitation (e.g. horizontal shaking or up-down movement) is used to ensure appropriate flow of PAA solution and PBS during immersion.

Then, PAA-coated colored SiHy lenses prepared above are placed in polypropylene lens packaging shells (one lens per shell) with 0.55 mL or 0.65 ml of the IPC saline prepared in Example 3 (about half of the saline may be added prior to inserting the lens). The blisters are then sealed with foil and autoclaved for about 45 minutes at about 121° C., forming colored SiHy contact lenses with cross-linked coatings (PAA-x-hydrophilic polymeric material) thereon.

Colored SiHy contact lenses are characterized in both the dry and wet state. In the dry state, pictures at 5-20× are taken to look for print integrity issues following the lens curing step.

It is found that the resultants colored SiHy contact lenses have a good print integrity and no color smearing and pigment migrations are observed.

Example 5

Colored SiHy contact lenses are prepared according to the procedure described in Example 4, except that only the a third color image (104) is printed onto the cured first clear coat (101) on the molding surface of the male mold half (100) with a Black ink prepared in Example 2, by using a pad printing system of FIG. 2 prior to print a second clear coat (105).

The control colored SiHy contact lenses are prepared as above except that the second clear coat (105) is not applied.

It is found that color smearing and pigment migrations are observed with the control colored SiHy contact lenses, whereas color smearing and pigment migrations are not observed with the colored SiHy contact lenses produced according to a method of the invention.

Example 6

Colored SiHy contact lenses are prepared according to the procedure described in Example 4, except that only the a second color image (103) is printed onto the cured first clear coat (101) on the molding surface of the male mold half (100) with a Dark Hazel ink prepared in Example 2, by using a pad printing system of FIG. 2 prior to print a second clear coat (105).

The control colored SiHy contact lenses are prepared as above except that the second clear coat (105) is not applied.

It is found that the migration and bleeding of iron oxide pigments is reduced by the presence of the sandwich layer according to the invention.

Example 7

Colored SiHy contact lenses are prepared according to the procedure described in Example 4, except that the second clear coat is formed from the polymerizable composition I prepared in Example 2. In this Example, the top clear coat and bottom clear coat employ the same polymerizable composition (Clear 1)

The control colored SiHy contact lenses are prepared as above except that the second clear coat (105) is not applied.

It is found that for the control lenses with a second clear coat, migration of the light brown hazel pigment/ink is observed toward the optic zone. However, this migration is significantly reduced with the presence of a second clear layer.

However, a higher % solids in the second polymerizable composition for forming the second clear coat (i.e., the top clear coat) may lead to pad pickup of previously printed layers. It is observed that, compared to the printed molds of Example 4 (i.e., using Clear 2 having about 40.55% solid polymer for forming the second clear coat), some printed molds, which involve using Clear 1 (having about 48% solid polymer) for forming both the first and second clear coats, are shown to have a portion of the color images is missing, probably because ink pickup may become an issue with the higher concentration of solid content in the polymerizable composition for forming the top clear coat, perhaps during the pad printing run as it loses solvent to evaporation.

All the publications, patents, and patent application publications, which have been cited herein above, are hereby incorporated by reference in their entireties.

What is claimed is:

1. A method for producing colored silicone hydrogel contact lenses,
   comprising the steps of:
   (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed;
   (2) forming, on the first or second molding surface, a transferrable, colored, and polymeric composite film which comprises a first polymeric film, a second polymeric film, and a cured colored image encapsulated therewithin, wherein the transferrable, colored and polymeric composite film is formed by
      (a) applying a first layer of a first polymerizable composition onto the first or second molding surface, wherein the first polymerizable composition is free of any pigment particle and comprises at least one first photoinitiator,
      (b) irradiating the first layer of the first polymerizable composition with a UV/visible light to at least partially cure the first layer to form a first polymeric film on the first or second molding surface,
      (c) printing a colored image with at least one ink on the first polymeric film on the first or second molding surface, wherein the ink comprises at least one pigment particles, an actinically-crosslinkable siloxane-containing binder polymer, a second photoinitiator, and at least one diluent, wherein the actinically-crosslinkable siloxane-containing binder polymer is soluble in said at least one diluent and comprises $1^{st}$ repeating units each having an ethylenically unsaturated group, $2^{nd}$ repeating units of at least one first hydrophilic vinylic monomer and $3^{rd}$ repeating units of at least one first siloxane-containing polymerizable component selected from the group consisting of a first siloxane-containing vinylic monomer, a first polysiloxane-containing vinylic crosslinker, and combinations thereof, (d) irradiating the printed colored image with a UV/visible light to cure the colored images on the first polymeric film on the first or second molding surface, (e) applying a second layer of a second polymerizable composition to completely cover the cured colored image on the first polymeric film, wherein the second polymerizable composition is free of any pigment particle and comprises at least one second photoinitiator, and (f) irradiating the second layer of the second polymerizable composition with a UV/visible light to at least partially cure the second layer to form the second polymeric film which, in combination with the first polymeric film, encapsulates the cured colored image;

(3) dispensing a third polymerizable composition into the lens-forming cavity of the mold, wherein the third polymerizable composition comprises (a) at least one second siloxane-containing polymerizable component selected from the group consisting of a second siloxane-containing vinylic monomer, a second polysiloxane containing vinylic crosslinker, and combinations thereof, (b) at least one second hydrophilic vinylic monomer, and (c) at least one thermal initiator, wherein the third polymerizable composition is in direct contact with and penetrates into the transferable, colored, and polymeric composite film on the first or second molding surface; and (4) thermally curing the third polymerizable composition within the lens-forming cavity for at least about 40 minutes to form the colored silicone hydrogel contact lens, whereby the transferrable, colored, and polymeric composite film detaches from the first or second molding surface and becomes integral with the body of the silicone hydrogel contact lens.

2. The method of claim 1, wherein the transferable, colored and polymeric composite film is formed on the first molding surface.

3. The method of claim 2, wherein said at least one diluent comprises at least one organic solvent.

4. The method of claim 3, wherein said at least one organic solvent is selected from the group consisting of tetrahydrofuran, tripropylene glycol methyl ether, dipropylene glycol methyl ether, ethylene glycol n-butyl ether, ketones, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

5. The method of claim 3, wherein the first and second polymerizable compositions independent of each other comprise the actinically-crosslinkable siloxane-containing binder polymer.

6. The method of claim 5, wherein the first and second polymerizable compositions independent of each other comprises at least one third siloxane-containing polymerizable component and at least one third hydrophilic vinylic monomer, wherein said third siloxane-containing polymerizable component comprises at least one third siloxane-containing vinylic monomer, at least one third polysiloxane-containing vinylic crosslinker, or combinations thereof.

7. The method of claim 6, wherein the first and second polymerizable compositions independent of each other comprises a non-silicone vinylic crosslinker having a (meth) acryloyl group and an ene group, wherein the non-silicone vinylic monomer is: allyl (meth) acrylate; N-allyl (meth)acrylate; a coupling reaction product of an acrylic monomer having a first functional group selected from the group consisting of a primary group, a secondary amino group, an aziridine group, an azlactone group, a carboxyl group, an epoxy group, an isocyanate group, and a hydroxyl group, with an ene monomer having a second functional group selected from the group consisting of a primary group, a secondary amino group, a carboxyl group, an epoxy group, an isocyanate group, and a hydroxyl group; or combinations thereof, wherein the first and second functional groups are different from each other but can react with each other in a coupling reaction to form a covalent linkage, wherein the acrylic monomer is $C_2$ to $C_6$ hydroxylalkyl (meth)acrylate, C2 to $C_6$ hydroxyalkyl (meth)acrylamide, amino-$C_2$-$C_6$ alkyl (meth)acrylamide, $C_1$-$C_6$ alkylamino-$C_2$-$C_6$ alkyl (meth)acrylamide, (meth)acrylic acid, $C_2$-$C_4$ alkylacrylic acid N-[tris(hydroxymethyl)-methyl]acrylamide, N,N-2-acrylamidoglycolic acid, 3-(acryloylxy)propanoic acid, N-hydroxysuccinimide ester of (meth)acrylic acid, glycidyl (meth)acrylate, $C_1$ to $C_6$ isocyanatoalkyl (meth)acrylate, 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, 2-vinyl-4,4-dimethyl-1,3-oxazolin-6-one, aziridinyl $C_1$-$C_{12}$ alkyl (meth)acrylate or combinations thereof, wherein the ene monomer is allylamine, 3-butenylamine, 4-pentenylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, 3-butenoic acid, 4-pentenoic acid, 5-hexenoic acid, 6-heptenoic acid, allyloxy glycidyl ether, 1,2-ppoxy-5-hexene, 3,4-epoxy-1-butene, 2-methyl-2-vinyloxirane, allyl isocyanate, 4-isocyanato-1-butene, allyl alcohol, allyloxyethanol, allyloxyethoxyethanol, allyloxyethoxyethoxyethanol, allyloxyethoxyethoxyethoxyethanol, allyloxypolyethylene glycol, 4-hydroxy-1-butene, 5-hydroxy-1-pentene, 4-hydroxy-1-pentene, 3-hydroxy-1-pentene, or combinations thereof.

8. The method of claim 6, wherein the actinically-crosslinkable siloxane-containing binder polymer is obtained by reacting a siloxane-containing polymer with an ethyleneically functionalizing vinylic agent which comprises an ethyleneically unsaturated group and a third functional group, wherein the siloxane-containing polymer comprises repeating units each having a pendant fourth functional group, wherein the third and fourth functional groups are different from each other and coreactive with each other under coupling reactions to form a covalent linkage, wherein the third and fourth functional group are selected from the group consisting of a hydroxyl group, a primary amino group, a secondary amino group of —NHR° in which R° is H or $C_1$-$C_{10}$alkyl, a carboxylic group, an epoxy group, an aldehyde group, an azlactone group, an aziridine group, an acid halide group of —COX, X=Cl, Br, or I, an isothiocyanate group, an isocyanate group, a halide group of —X, X=Cl, Br, or I, an acid anhydride group, and combinations thereof,
wherein the siloxane-containing polymer is a copolymerization product of a reactive composition which comprises: (a) at least one functional vinylic monomer having the fourth functional group, (b) at least one first hydrophilic vinylic monomer, (c) at least one first siloxane-containing polymerizable component selected from the group consisting of a first siloxane-containing vinylic monomer, a first polysiloxane-containing vinylic crosslinker, and combinations thereof, (d) a free radical initiator, and (e) optionally a chain-transfer agent, in presence of an organic solvent,
wherein said at least one ethyleneically functionalizing vinylic monomer and the functional vinylic monomer independent of each other are selected from the group consisting of a $C_2$ to $C_6$ hydroxylalkyl (meth)acrylate, a $C_2$ to $C_6$ hydroxyalkyl (meth)acrylamide, an amino-$C_2$-$C_6$ alkyl (meth)acrylamide, a $C_1$-$C_6$ alkylamino-$C_2$-$C_6$ alkyl (meth)acrylamide, (meth)acrylic acid, ethylacrylic acid, propylacrylic acid, butylacrylic acid, N-[tris(hydroxymethyl)-methyl]acrylamide, N,N-2-acrylamidoglycolic acid, 3-(acryloylxy)propanoic acid, $CH_2$=CH—COCl, $CH_2$=$CCH_3$—COCl, $CH_2$=CH—COBr, $CH_2$=$CCH_3$—COBr, N-hydroxysuccinimide ester of (meth)acrylic acid, glycidyl (meth)acrylate, a $C_1$ to $C_6$ isocyanatoalkyl (meth)acrylate, 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, an aziridinyl $C_1$-$C_{12}$ alkyl (meth)acrylate acrolein, methacrolein, crotonaldehyde, acrolein dimethyl acetal, acrolein diethyl acetal, methacrolein dimethyl acetal, methacrolein diethyl acetal, methyl vinyl ketone, 3-methyl-3-buten-2-one, 3-penten-2-one, ethyl vinyl ketone, propyl vinyl ketone, isopropyl vinyl ketone, vinyl butyl ketone, tert-butyl vinyl ketone, iso-butyl vinyl ketone, methyl allyl ketone, and combinations thereof.

9. The method of claim 8, wherein the ink further comprises at least one polymeric dispersant selected from the group consisting of polyvinylpyrrolidone, alkylamino-functionalized polyethylene oxide and polypropylene oxides, polyoxyethylene alkylether polymers with a phosphate ester functionality, polyacrylic acid (PAA), polymethacrylic acid (PMAA), a homopolymer of vinylic monomer containing a dialkylamine group, a copolymer of vinylic monomer containing a dialkylamine group with another vinylic monomer, a homopolymer of a vinylic monomer containing a phosphate ester group, a copolymer of a vinylic monomer containing a phosphate ester group with another vinylic monomer, and combinations thereof.

10. The method of claim 9, wherein the first, second and third siloxane-containing polymerizable components independent of one another comprises:
(a) a vinylic monomer selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-

C$_4$-alkyl terminated polydimethylsiloxane, α-(meth)acryloxy(polyethylenoxy)-2-hydroxypropyloxypropyl]-terminated ω-C$_1$-C$_4$-alkyl terminated polydimethylsiloxane, α-[(meth)acryloxy-2-hydroxypropyloxy-ethoxypropyl]-terminated ω-C$_1$-C$_4$-alkyl terminated polydimethylsiloxane, α-[(meth)acryloxy-2-hydroxypropyl-N-ethylaminopropyl]-terminated ω-C$_1$-C$_4$-alkyl terminated -polydimethylsiloxane, α-[(meth)acryloxy-2-hydroxypropyl-aminopropyl]-terminated ω-C$_1$-C$_4$-alkyl terminated polydimethylsiloxane, α-[(meth)acryloxy-2-hydroxypropyloxy-(polyethylenoxy)propyl]-terminated ω-C$_1$-C$_4$-alkyl terminated polydimethylsiloxane, α-(meth)acryloylamidopropyloxypropyl terminated ω-C$_1$-C$_4$-alkyl terminated polydimethylsiloxane, α-N-methyl-(meth)acryloylamidopropyloxypropyl terminated ω-C$_1$-C$_4$-alkyl terminated polydimethylsiloxane, α-[3-(meth)acrylamidoethoxy-2-hydroxypropyloxypropyl]-terminated w-C$_1$-C$_4$-alkyl polydimethylsiloxane, α-[3-(meth)acrylamidopropyloxy-2-hydroxypropyloxypropyl]-terminated w-C$_1$-C$_4$-alkyl terminated polydimethylsiloxane, α-[3-(meth)acrylamidoisopropyloxy-2-hydroxypropyloxypropyl]-terminated ω-C$_1$-C$_4$-alkyl terminated polydimethylsiloxane, α-[3-(meth)acrylamidobutyloxy-2-hydroxypropyloxypropyl]-terminated w-C$_1$-C$_4$-alkyl terminated polydimethylsiloxane, α-[3-(meth)acryloylamido-2-hydroxypropyloxypropyl] terminated ω-C$_1$-C$_4$-alkyl polydimethylsiloxane, α-[3-[N-methyl-(meth)acryloylamido]-2-hydroxypropyloxypropyl] terminated ω-C$_1$-C$_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-C$_1$-C$_4$-alkyl-terminated polydimethylsiloxanes, α-vinyl carbamate-terminated ω-C$_1$-C$_4$-alkyl-terminated polydimethylsiloxane, and combinations thereof;
(b) a vinylic monomer selected from the group consisting of tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy) butylsilane, 3-(meth)acryloxy-2-(2-hydroxyethoxy)-propyloxy)propylbis(trimethylsiloxy) methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)silylpropyl](meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)-propyloxy)propyl] (meth)acrylamide, N,N-bis[2-hydroxy-3-(3-(tris(trimethylsilyloxy)silyl)-propyloxy)propyl]-2-methyl (meth)acrylamide, N,N-bis[2-hydroxy-3-(3-(tris(trimethylsilyloxy)-silyl)propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl](meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, and combinations thereof;
(c) a vinylic crosslinker selected from the group consisting of α,ω-bis[3-(meth)acrylamido-propyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxy-propyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamido-ethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxy-propyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy) propyl]-terminated polydimethylsiloxane, and combinations thereof; or
(d) combinations thereof.
11. The method of claim 9, wherein the first, second and third siloxane-containing polymerizable components independent of one another comprises a vinylic crosslinker of formula (1)

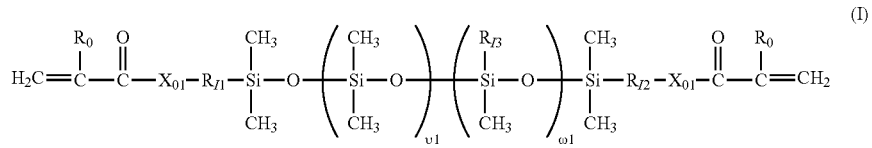
(I)

in which:
- ν1 is an integer of from 30 to 500 and ω1 is an integer of from 1 to 75, provided that ω1/ν1 is from about 0.035 to about 0.15;
- $X_{01}$ is O or $NR_N$ in which $R_N$ is hydrogen or a $C_1$-$C_{10}$-alkyl;
- $R_o$ is hydrogen or methyl;
- $R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$alkylene divalent radical;
- $R_{I3}$ is a monovalent radical of any one of formula (Ia) to (Ie)

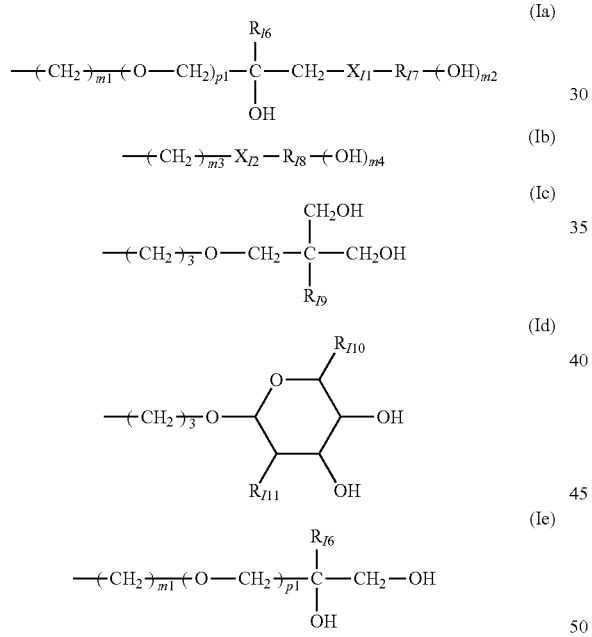

- p1 is zero or 1; m1 is an integer of 2 to 4; m2 is an integer of 1 to 5; m3 is an integer of 3 to 6;
- m4 is an integer of 2 to 5;
- $R_{I6}$ is hydrogen or methyl;
- $R_{I7}$ is a $C_2$-$C_6$ hydrocarbon radical having (m2+1) valencies;
- $R_{I8}$ is a $C_2$-$C_6$ hydrocarbon radical having (m4+1) valencies;
- $R_{I9}$ is ethyl or hydroxymethyl;
- $R_{I10}$ is methyl or hydromethyl;
- $R_{I11}$ is hydroxyl or methoxy;
- $X_{I1}$ is a sulfur linkage of —S— or a tertiary amino linkage of —$NR_{I12}$— in which $R_{I12}$ is methyl, hydroxyethyl, hydroxypropyl, or 2,3-dihydroxypropyl; and $X_{I2}$ is an amide linkage of

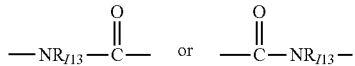

in which $R_{I13}$ is hydrogen or a $C_1$-$C_{10}$alkyl.

12. The method of claim 9, wherein the first, second and third polymerizable compositions independent of one another comprises:
(a) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof;
(b) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof;
(c) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof;
(d) a carboxyl-containing acrylic monomer selected from the group consisting of 2-(meth)acrylamidoglycolic acid, (meth)acrylic acid, ethylacrylic acid, and combinations thereof;
(e) an acrylic monomer selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, a $C_1$-$C_4$-alkoxy poly(ethylene glycol) (meth)acrylate having a number average molecular weight of up to 1500, a methoxy-poly (ethylene glycol)ethyl (meth)acrylamide having a number average molecular weight of up to 1500, and combinations thereof; or
(f) combinations thereof.

13. The method of claim 9, wherein the third polymerizable composition comprises at least one hydrophilic N-vinyl amide monomer and at least one hydrophilic acrylic monomer.

14. The method of claim 13, wherein the hydrophilic N-vinyl amide monomer is selected from the group consisting of N-vinylpyrrolidone, N-vinyl-N-methyl acetamide, and combinations thereof, wherein the hydrophilic acrylic monomer is selected from the group consisting of N,N-dimethyl (meth)acrylamide, (meth)acrylamide, N-hydroxylethyl (meth)acrylamide, N-hydroxypropyl (meth)acrylamide, hydroxyethyl methacrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1200, poly(ethylene glycol) ethyl (meth)acrylamide having a number average molecular weight of up to 1200, ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, a polyethylene glycol (meth)acrylate having a number average molecular weight of up to 1200, a polyethylene glycol $C_1$-$C_4$-alkyl ether (meth)acrylate having a number average molecular weight of up to 1200, N-[tris(hydroxymethyl)methyl]-acrylamide, (meth)acrylic acid, ethylacrylic acid, 2-(meth)acrylamidoglycolic acid, a phosphorylcholine-containing vinylic monomer, and combinations thereof.

15. The method of claim 9, wherein at least one of the first, second, and third polymerizable compositions comprises a hydrophobic acrylic monomer selected from the group consisting of methyl methacrylate, ethyl methacrylate, isopropyl methacrylate, sec-butyl methacrylate, tert-butyl methacrylate, cyclohexyl methacrylate, isobornyl acrylate, isobornyl methacrylate, phenyl methacrylate, 4-tert-butylstyrene, 2-methylstyrene, styrene, 4-ethoxystyrene, 2,4-dimethystyrene, 2,5-dimethylstyrene, 3,5-dimethylstyrene, and combinations thereof.

16. The method of claim 9, wherein the third polymerizable composition comprises: (a) from about 15% to about 55% by weight of said at least one first siloxane-containing polymerizable component; (b) from about 35% to about 65% by weight of said at least one first hydrophilic vinylic monomer; (c) from about 2.0% or less by weight of at least one non-silicone vinylic crosslinkers; (d) from about 5% to about 15% by weight of at least one hydrophobic acrylic monomer; (e) from 0 to about 16% by weight of at least one organic solvent; and (f) from about 0.1% to about 2.0% by weight of said at least one thermal free radical initiator, relative to the total amount of all polymerizable components in the polymerizable composition, provided that the sum of the amounts of components (a) to (f) and other not-listed polymerizable components is 100%.

17. The method of claim 9, wherein the colored image is printed on the first polymeric film by using an inkjet printing system.

18. The method of claim 9, wherein the colored image is printed on the first polymeric film by using a pad-transfer printing system.

19. The method of claim 9, wherein step (4) is carried out in an oven at a temperature of from 40° C. to 100° C. for a period of time of from about 1 to about 24 hours.

* * * * *